US012462721B2

(12) United States Patent
Piao et al.

(10) Patent No.: US 12,462,721 B2
(45) Date of Patent: Nov. 4, 2025

(54) DISPLAY PANEL AND DISPLAY DEVICE

(71) Applicant: Xiamen Tianma Optoelectronics Co., Ltd., Xiamen (CN)

(72) Inventors: Zhe Piao, Xiamen (CN); Chenpeng Wang, Xiamen (CN); Hongyu Wang, Xiamen (CN); Xuyang Weng, Xiamen (CN); Jiaqi Kang, Xiamen (CN); Hong Chen, Xiamen (CN); Qinghao Zhu, Xiamen (CN); Yalan Guo, Xiamen (CN)

(73) Assignee: Xiamen Tianma Optoelectronics Co., Ltd., Xiamen (CN)

( * ) Notice: Subject to any disclaimer, the term of this patent is extended or adjusted under 35 U.S.C. 154(b) by 2 days.

(21) Appl. No.: 18/405,110

(22) Filed: Jan. 5, 2024

(65) Prior Publication Data

US 2024/0161678 A1 May 16, 2024

(30) Foreign Application Priority Data

Sep. 26, 2023 (CN) ........................ 202311254314.X

(51) Int. Cl.
*G09G 3/20* (2006.01)
*G09G 3/3266* (2016.01)

(52) U.S. Cl.
CPC ............. *G09G 3/20* (2013.01); *G09G 3/3266* (2013.01); *G09G 2310/0267* (2013.01); *G09G 2310/061* (2013.01); *G09G 2310/08* (2013.01); *G09G 2320/02* (2013.01); *G09G 2330/021* (2013.01)

(58) Field of Classification Search
None
See application file for complete search history.

(56) References Cited

U.S. PATENT DOCUMENTS

2004/0217935 A1* 11/2004 Jeon ........................ G11C 19/28 345/100
2007/0164954 A1* 7/2007 Yang .................... H10H 20/852 345/88
2009/0278782 A1* 11/2009 Chen .................... G09G 3/3677 345/100
2010/0201666 A1* 8/2010 Tobita .................. G09G 3/3677 377/79

(Continued)

FOREIGN PATENT DOCUMENTS

CN 112951140 A 6/2021
CN 115719577 A 2/2023
CN 117116198 A 11/2023

*Primary Examiner* — Dorothy Harris
(74) *Attorney, Agent, or Firm* — KDW Firm PLLC

(57) ABSTRACT

Provided are a display panel including multiple scan lines located in the display region and gate drive unit groups located in a non-display region. The gate drive unit groups include at least one first gate drive unit group and at least one second gate drive unit group. The first gate drive unit group includes multiple cascaded first gate drive units. The second gate drive unit group includes multiple cascaded second gate drive units. The first gate drive units and the second gate drive units are connected to different scan lines. A first period during which a first gate drive unit at the first stage transmits an effective level signal to a scan line and a second period during which a second gate drive unit at the first stage transmits an effective level signal to a scan line overlap, overlap duration is t, and t>0.

18 Claims, 11 Drawing Sheets

(56) References Cited

U.S. PATENT DOCUMENTS

| | | | | |
|---|---|---|---|---|
| 2011/0002438 | A1* | 1/2011 | Kim | G11C 19/28 377/67 |
| 2012/0062528 | A1* | 3/2012 | Kimura | G09G 3/2096 345/204 |
| 2020/0126466 | A1* | 4/2020 | Hosoyachi | G09G 3/3677 |
| 2020/0251066 | A1* | 8/2020 | Hu | G09G 3/3677 |

* cited by examiner

DISPLAY PANEL AND DISPLAY DEVICE

CROSS-REFERENCE TO RELATED APPLICATION(S)

This application claims priority to Chinese Patent Application No. 202311254314.X filed Sep. 26, 2023, the disclosure of which is incorporated herein by reference in its entirety.

TECHNICAL FIELD

The present invention relates to the field of display technology and, in particular, to a display panel and a display device.

BACKGROUND

From the age of a cathode-ray tube (CRT) to the age of a liquid crystal display (LCD), and now to the display age of an organic light-emitting diode (OLED) and the display age of a light-emitting diode, the display industry has experienced decades of development and has changed rapidly. The display industry has been closely related to our lives. From traditional mobile phones, tablet computers, televisions, computers, to current smart wearable devices, virtual reality devices, in-vehicle displays, and other electronic devices, they are all inseparable from display technology.

With the development of display technology, people have increasingly higher requirements for the display quality of display products. When the length of the scan line in a display panel is large, and there are many connected sub-pixels, the load on the scan line increases. At this time, there is a large difference between the charge capacity of the far end and the charge capacity of the near end of the scan line, which affects the overall display effect of a display product.

SUMMARY

In view of the above, the present invention provides a display panel and a display device to improve the consistency of the charge capacity of the far end and the charge capacity of the near end of a scan line, thereby improving the display effect of a product.

In a first aspect, the present invention provides a display panel. The display panel includes a display region and a non-display region at least partially surrounding the display region. The display panel also includes multiple scan lines located in the display region and gate drive unit groups located in the non-display region.

The gate drive unit groups include at least one first gate drive unit group and at least one second gate drive unit group. The first gate drive unit group includes multiple cascaded first gate drive units. The second gate drive unit group includes multiple cascaded second gate drive units. The first gate drive units and the second gate drive units are connected to different scan lines for transmitting scan signals to the scan lines. A scan signal includes an effective level signal.

A period during which a first gate drive unit at the first stage transmits an effective level signal to a scan line is a first period. A period during which a second gate drive unit at the first stage transmits an effective level signal to a scan line is a second period. The first period and the second period overlap. Overlap duration is t, and t>0.

In a second aspect, the present invention provides a display device that includes the display panel provided in the first aspect of the present invention.

BRIEF DESCRIPTION OF DRAWINGS

The drawings, which are incorporated in and constitute a part of the description, illustrate embodiments of the present invention and, together with the description, serve to explain the principles of the present invention.

DETAILED DESCRIPTION

Figure 1:
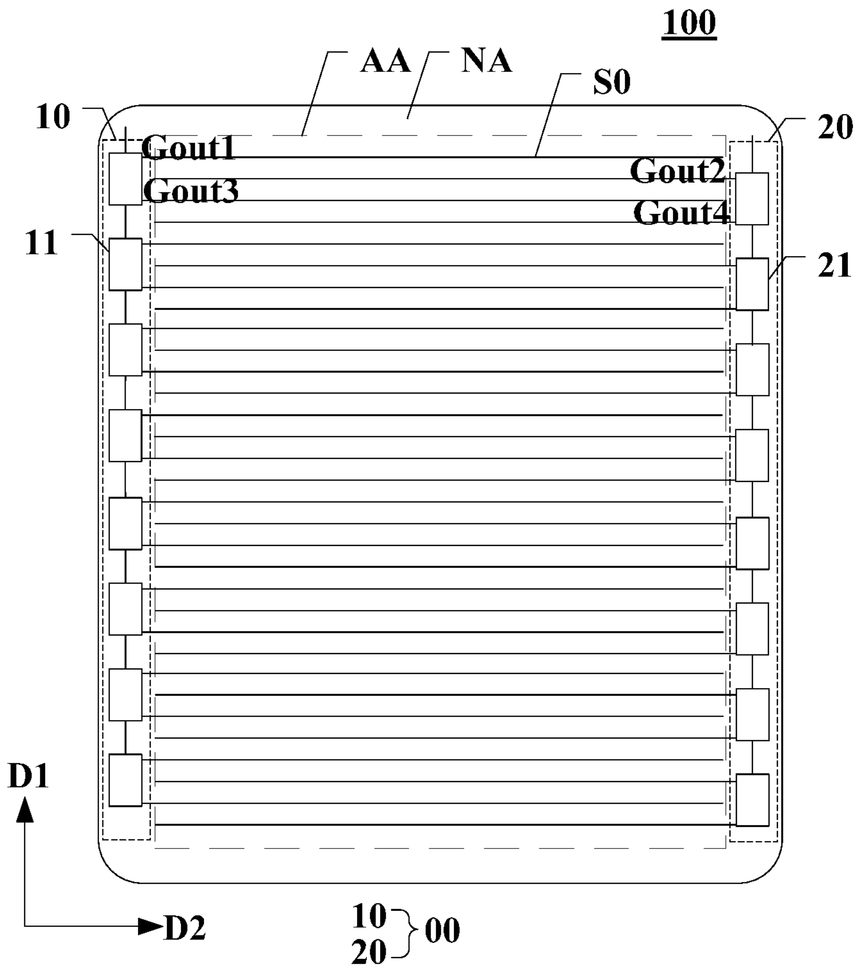
FIG. 1 is a diagram illustrating the structure of a display panel according to an embodiment of the present invention.

Various example embodiments of the present invention are described in detail with reference to the drawings. It should be noted that relative arrangements of components and steps, numerical expressions, and numerical values set forth in these embodiments do not limit the scope of the present invention unless otherwise specified.

The following description of at least one example embodiment is merely illustrative in nature and is in no way intended to limit the present invention and the application or usages thereof.

Techniques, methods, and devices known to those of ordinary skill in the related art may not be discussed, but where appropriate, such techniques, methods, and devices should be considered part of the specification.

In all examples shown and discussed herein, any values should be construed as merely exemplary and not as limiting. Therefore, other examples of the example embodiments may have different values.

It is obvious for those skilled in the art that various modifications and changes in the present invention may be made without departing from the spirit or scope of the present invention. Accordingly, the present invention is intended to cover modifications and variations of the present invention that fall within the scope of the corresponding claims (the claimed technical solutions) and their equivalents. It is to be noted that embodiments of the present invention, if not in collision, may be combined with each other.

It should be noted that similar reference numerals and letters indicate similar items in the drawings below, and therefore, once a particular item is defined in a drawing, the item need not to be further discussed in the drawings below.

Figure 2:
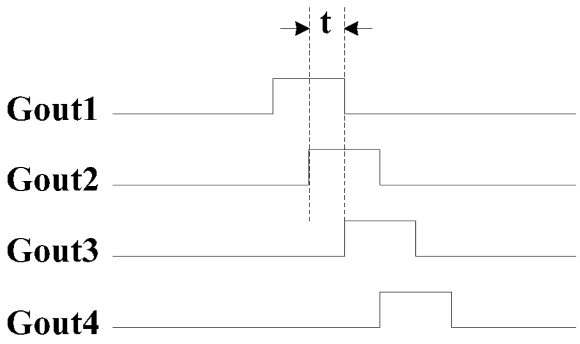
FIG. 2 is a working timing diagram of a gate drive unit group.

FIG. 1 is a diagram illustrating the structure of a display panel according to an embodiment of the present invention. FIG. 2 is a working timing diagram of a gate drive unit group. Referring to FIGS. 1 and 2, an embodiment of the present invention provides a display panel 100. The display panel 100 includes a display region AA and a non-display region NA at least partially surrounding the display region AA. The display panel 100 also includes multiple scan lines S0 located in the display region AA and gate drive unit groups 00 located in the non-display region NA.

The gate drive unit groups 00 includes at least one first gate drive unit group 10 and at least one second gate drive unit group 20. The first gate drive unit group 10 includes multiple cascaded first gate drive units 11. The second gate drive unit group 20 includes multiple cascaded second gate drive units 21. The first gate drive units 11 and the second gate drive units 21 are connected to different scan lines S0 for transmitting scan signals to the scan lines S0. A scan signal includes an effective level signal.

A period during which a first gate drive unit 11 at the first stage transmits an effective level signal to a scan line S0 is a first period. A period during which a second gate drive unit 21 at the first stage transmits an effective level signal to a scan line S0 is a second period. The first period and the second period overlap. Overlap duration is t, and $t>0$.

It is to be noted that FIG. 1 illustrates only the connection relationship of a scan line S0 in the display panel and a gate drive unit corresponding to the scan line S0 and does not limit the number of scan lines S0 and the number of gate drive units actually included in the display panel. The positions of the first gate drive unit group 10 and the second gate drive unit group 20 in the display panel in FIG. 1 are also illustrative only. In some other embodiments of the present invention, the positions of the first gate drive unit group 10 and the second gate drive unit group 20 in the display panel may also be embodied as others, which may be described in subsequent embodiments.

Figure 3:
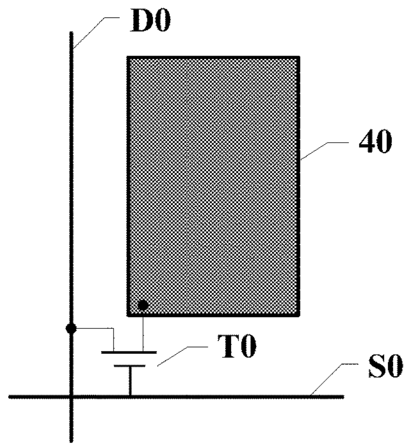
FIG. 3 is a diagram of the connection between a sub-pixel, a scan line and a data line.

Although not shown in FIG. 1, it is to be understood that the same scan line S0 is electrically connected to multiple sub-pixels in the display pane. For example, the specific connection relationship between a scan line S0 and a sub-pixel may be referred to FIG. 3. A sub-pixel includes a transistor T0 and a pixel electrode 40. The gate of the transistor T0 is electrically connected to a scan line S0. A first electrode of the transistor T0 is electrically connected to a data line D0. A second electrode is electrically connected to the pixel electrode 40. FIG. 3 is a diagram of the connection between a sub-pixel, a scan line S0 and a data line D0. Referring to FIGS. 1 and 3, the gate drive unit groups 00 located in the non-display region NA includes a first gate drive unit group 10 and a second gate drive unit group 20. First gate drive units 11 in the first gate drive unit group 10 are connected in cascade. Second gate drive units 21 in the second gate drive unit group 20 are connected in cascade. The first gate drive units 11 and the second gate drive units 21 are connected to different scan lines S0 for transmitting scan signals to the scan lines S0. A scan signal includes an effective level signal. The effective level signal here refers to a signal that can control the transistor T0 connected to a scan line S0 to turn on. When the transistor is turned on, the data signal on the data line D0 can be transmitted to the pixel electrode 40 to drive the corresponding sub-pixel to perform a display function.

In the related art, if the length of a scan line is long, and the number of sub-pixels connected by the scan line is large, the load on the scan line is large. When a gate drive unit provides a scan signal to the scan line from one end of the scan line, and the scan signal is transmitted from one end of the scan line to the other end of the scan line, the voltage drop is large, and the attenuation problem of the scan signal is serious. As a result, the difference between the scan signal received at the far end of the scan line S0 and the scan signal received at the near end of the scan line S0 is relatively large, thereby affecting the overall display effect.

To solve the preceding technical problems, in the display panel provided by this embodiment of the present invention, the period during which the first gate drive unit 11 at the first stage transmits the effective level signal to the corresponding scan line S0 is the first period. The period during which the second gate drive unit 21 at the first stage transmits the effective level signal to the corresponding scan line S0 is the second period. The first period and the second period overlap, and the overlap duration is greater than 0. When a frame time is fixed duration, in a frame time, if the first period and the second period do not overlap, the duration corresponding to the first period and the duration corresponding to the second period are limited. For a display panel having the same size and the same PPI, the number of scan lines is constant. If the effective level signals received by two adjacent scan lines do not overlap, assuming that in a frame time, the total duration of the effective level signal sent to each scan line is T01, and the number of scan lines is N, then the duration of the effective level signal received by each scan line is T01/N. In this embodiment of the present invention, the first period during which the first gate drive unit transmits the effective level signal to the corresponding scan line is configured to overlap the second period during which the second gate drive unit transmits the effective level signal to the corresponding scan line, and the overlap duration t is greater than 0. Thus, in a frame time, the total duration of the effective level signal sent to each scan line becomes T02. Since the preceding overlap duration t is greater than 0, T02>T01. Thus, in the display panel provided by the present invention, the duration of the effective level signal received by each scan line is T02/N, and T02/N>T01/N. In this manner, compared with the solution where the effective level signals of two adjacent scan lines do not overlap, in the present application, it is beneficial to extend the duration during which a first gate drive unit 11 sends an effective level to the corresponding scan line S0 and the duration during which a second gate drive unit 11 sends an effective level to the corresponding scan line S0 respectively. That is, it is beneficial to extend the charging duration of a scan line S0. Thus, the charge capacity of the scan line S0 is effectively improved by extending the charging duration, and it is beneficial to improve the consistency of the charge capacity of the far end and the charge capacity of the near end of the scan line S0, thereby improving the overall display effect of a display product.

Figure 4:
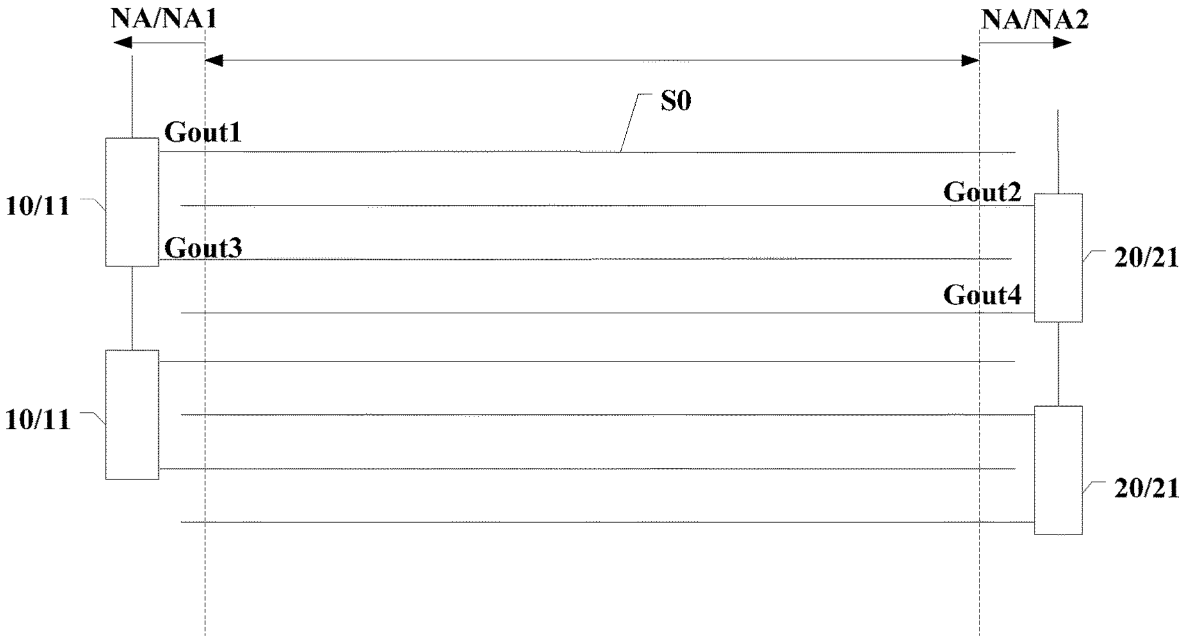
FIG. 4 is a diagram showing the connection between a first gate drive unit and a second gate drive unit and a scan line.

FIG. 4 is a diagram showing the connection between a first gate drive unit 11 and a second gate drive unit 12 and a scan line S0. This embodiment shows only the connection relationships between partial first gate drive units 11 and partial second gate drive units 21 and partial scan lines S0 in the display panel. The connection relationships between other scan lines S0 and other gate drive units may be referred to in FIG. 4.

Referring to FIG. 4, in an embodiment of the present invention, a single first gate drive unit 11 is electrically connected to two scan lines S0. A single second gate drive unit 21 is electrically connected to two scan lines S0. Two scan lines S0 connected to the same first gate drive unit 11 are not adjacent in a first direction D1. Two scan lines S0 connected to the same second gate drive unit 21 are not adjacent in the first direction D1. The first direction D1 is the alignment direction of multiple scan lines S0.

In an embodiment, referring to FIG. 4, in a gate drive unit provided by this embodiment of the present invention, each first gate drive unit 11 is electrically connected to two scan lines S0, and each second gate drive unit 21 is electrically connected to two scan lines S0. Two scan lines S0 connected to the same first gate drive unit 11 are not adjacent. Two scan lines S0 connected to the same second gate drive unit 21 are not adjacent. "Not adjacent" here may be understood that in the arrangement direction of scan lines S0, a scan line S0 connected to a second gate drive unit 21 is disposed between the two scan lines S0 connected to the same first gate drive unit 11, and a scan line S0 connected to a first gate drive unit 11 is disposed between the two scan lines S0 connected to the same second gate drive unit 21. The effective level signal sent by a first gate drive unit 11 at the first stage to a scan line S0 and the effective level signal sent by a second gate drive unit 21 at the first stage to a scan line S0 overlap, which is limited in this embodiment. When two scan lines S0 connected to the same first gate drive unit 11 are not adjacent, and two scan lines S0 connected to the same second gate drive unit 21 are not adjacent, in the arrangement direction of scan lines S0, the scan lines S0 that overlap in the period of time of obtaining an effective level signal are adjacent and are connected to different gate drive units. In this manner, it is beneficial to avoid the problem that a hedging abnormality may occur when adjacent scan lines S0 are connected to the same gate drive unit and overlap in the period of time of receiving an effective level signal, thereby improving the overall display stability of the display panel.

It is to be noted that a description is given with reference to FIG. 4 by using an example in which a first gate drive unit 11 is connected to an odd number of scan lines S0, and a second gate drive unit 21 is connected to an even number of scan lines S0. The present invention is not limited thereto, as long as two scan lines S0 connected to the same first gate drive unit 11 are not adjacent, and two scan lines S0 connected to the same second gate drive unit 21 are not adjacent. In some other embodiments of the present invention, the first gate drive unit 11 may also be connected to an even number of scan lines S0, and the second gate drive unit 21 may also be connected to an odd number of scan lines S0.

Figure 5:
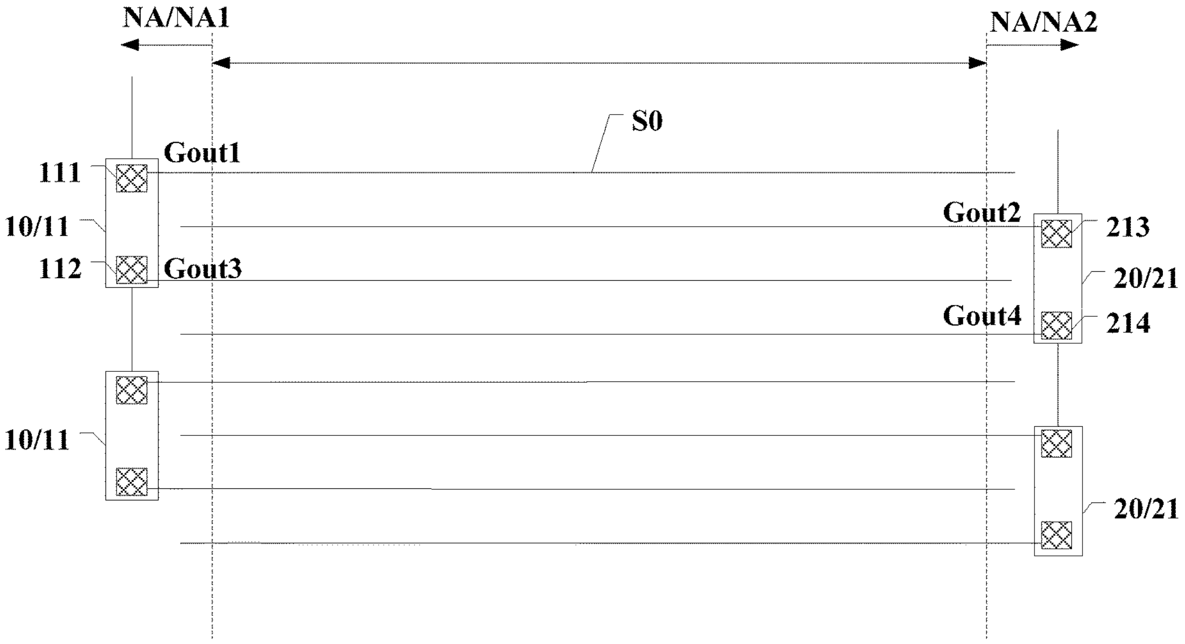
FIG. 5 is another diagram showing the connection between a first gate drive unit and a second gate drive unit and a scan line.

FIG. 5 is another diagram showing the connection between a first gate drive unit 11 and a second gate drive unit 12 and a scan line S0. In this embodiment, the first gate drive unit 11 and the second gate drive unit 21 are refined.

Referring to FIG. 5, in an embodiment of the present invention, a single first gate drive unit 11 includes a first driver circuit 111 and a second driver circuit 112. The first driver circuit 111 and the second driver circuit 112 are connected to different scan lines S0. A single second gate drive unit 21 includes a third driver circuit 213 and a fourth driver circuit 214. The third driver circuit 213 and the fourth driver circuit 214 are connected to different scan lines S0.

In an embodiment, in this embodiment of the present invention, each of a single first gate drive unit 11 and a single second gate drive unit 21 includes two driver circuits. The driver circuit included in the first gate drive unit 11 is the first driver circuit 111 and the second driver circuit 112. The driver circuit included in the second gate drive unit 21 is the third driver circuit 213 and the fourth driver circuit 214. The first driver circuit 111, the second driver circuit 112, the third driver circuit 213, and the fourth driver circuit 214 are connected to different scan lines S0. When a first gate drive unit 11 is connected to two scan lines S0, and a second gate drive unit 21 is connected to two scan lines S0, each of the first gate drive unit 11 and the second gate drive unit 21 includes two driver circuits, which is further limited in this embodiment. The two driver circuits are connected to different scan lines S0. The two scan lines S0 connected to the same gate drive unit are controlled by different driver circuits. In this manner, it is beneficial to improve the stability of the scan signals received by different scan lines S0. It is to be noted that the two driver circuits included in the same gate drive unit may be circuits that are independent of each other or may share some structures, which may be described in subsequent embodiments.

Further referring to FIGS. 4 and 5, in an embodiment of the present invention, in the first direction D1, the first driver circuit 111 and the second driver circuit 112 are connected to the odd-numbered scan line S0, and the third driver circuit 213 and the fourth driver circuit 214 are connected to the even-numbered scan line S0.

When two scan lines S0 connected to the first gate drive unit 11 are not adjacent, and two scan lines S0 connected to the second gate drive unit 21 are not adjacent, the first driver circuit 111 and the second driver circuit 112 in the first gate drive unit 11 are connected to the odd-numbered scan line S0, and the third driver circuit 213 and the fourth driver circuit 214 in the second gate drive unit 21 are connected to the even-numbered scan line S0, which are limited in this embodiment. In this manner, it is helpful to simplify the connection complexity between a driver circuit and a scan line S0, thereby reducing the overall manufacturing process of the display panel.

Of course, the connection method between a first gate drive unit 11 and a second gate drive unit 21 and a scan line S0 is not limited to the structure of FIGS. 4 and 5. In some other embodiments of the present invention, the first driver circuit 111 and the second driver circuit 112 may also be connected to the even-numbered scan line S0, and the third driver circuit 213 and the fourth driver circuit 214 may also be connected to the odd-numbered scan line S0.

Figure 6:
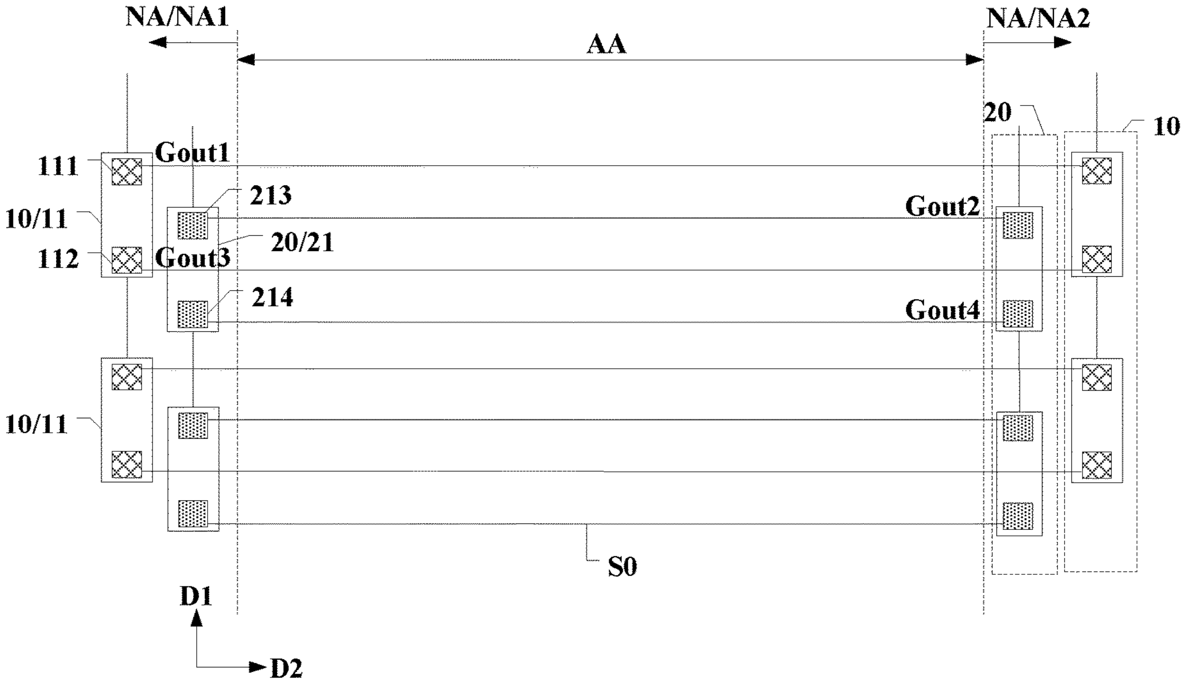
FIG. 6 is a diagram showing the connection between a first gate drive unit group and a second gate drive unit group and a scan line.

FIG. 6 is a diagram showing the connection between a first gate drive unit group and a second gate drive unit group 20 and a scan line S0.

Referring to FIG. 6, in an embodiment of the present invention, the non-display region NA includes a first non-display region NA1 and a second non-display region NA2. The first non-display region NA1 and the second non-display region NA2 are located on two sides of the display region AA in a second direction D2. The second direction D2 is the extension direction of the scan lines S0.

The first non-display region NA1 is provided with a first gate drive unit group 10 and a second gate drive unit group

20. The second non-display region NA2 is provided with another first gate drive unit group 10 and another second gate drive unit group 20. In the two first gate drive unit groups 10, a first driver circuit 111 at the same stage is connected to the same scan line S0, and a second driver circuit 112 at the same stage is connected to the same scan line S0. In the two second gate drive unit groups 20 a third driver circuit 213 at the same stage is connected to the same scan line S0, and a fourth driver circuit 214 at the same stage is connected to the same scan line S0.

In an embodiment, this embodiment shows a scheme in which each of the first non-display region NA1 and the second non-display region NA2 on two sides of the display region AA in the second direction D2 is provided with a first gate drive unit group 10 and a second gate drive unit group 20. Two first gate drive unit groups 10 disposed in a first display region AA and a second display region AA are designed symmetrically and configured to drive the odd-numbered scan line S0 or even-numbered scan line S0. Two second gate drive unit groups 20 disposed in the first display region AA and the second display region AA are designed symmetrically and configured to drive the even-numbered scan line S0 or odd-numbered scan line S0. A description is given with reference to FIG. 6 by using an example in which a first gate drive unit group 10 is connected to the odd-numbered scan line S0, and a second gate drive unit group 20 is connected to the even-numbered scan line S0. In some other embodiments of the present invention, the first gate drive unit group 10 may also be connected to the even-numbered scan line S0, and the second gate drive unit group 20 may also be connected to the odd-numbered scan line S0.

In this embodiment, the first gate drive unit groups 10 are disposed in the first non-display region NA1 and the second non-display region NA2, and the second gate drive unit groups 20 are disposed in the first non-display region NA1 and the second non-display region NA2. In this manner, bilateral driving of each scan line S0 is implemented. In two first gate drive unit groups 10 and two second gate drive unit groups 20 located in the first non-display region NA1 and the second non-display region NA2, a driver circuit 111 at the same stage is connected to the same scan line S0. The method for driving one scan line S0 by two gate driver circuits effectively improves the driving capability of a gate driver circuit for a scan line S0. In addition, in this embodiment of the present invention, a period during which a first gate drive unit 11 at the first stage transmits an effective level signal to a scan line S0 is configured to overlap a period during which a second gate drive unit 21 at the first stage transmits an effective level signal to a scan line S0. In this manner, the charging capability of the scan line S0 is improved by extending the duration during which each gate drive unit transmits an effective level to the connected scan line S0. In combination with a bilateral driving method, it is more beneficial to reduce the difference in drive capabilities at different positions of the scan line S0, and it is more beneficial to increase the overall display effect of the display panel.

It is to be noted that in the embodiment shown in FIG. 6, to clearly illustrate a first gate drive unit group 10 and a second gate drive unit group 20, the first gate drive unit group 10 and the second gate drive unit group 20 in the same non-display region NA are arranged in a staggered manner, which does not represent the actual position relationship between the first gate drive unit 11 and the second gate drive unit 21 in the non-display region NA. In some other embodiments of the present invention, a first gate drive unit 11 and a second gate drive unit 21 may not need to be arranged in a staggered manner. In the embodiment shown in FIG. 6, the first driver circuit 111 and the second driver circuit 112 in the first gate drive unit 11 and the third driver circuit 213 and the fourth driver circuit 214 in the second gate drive unit 21 are filled with different patterns only to clearly distinguish driver circuits in different drive units. The specific structure of a driver circuit is not limited.

Figure 7:
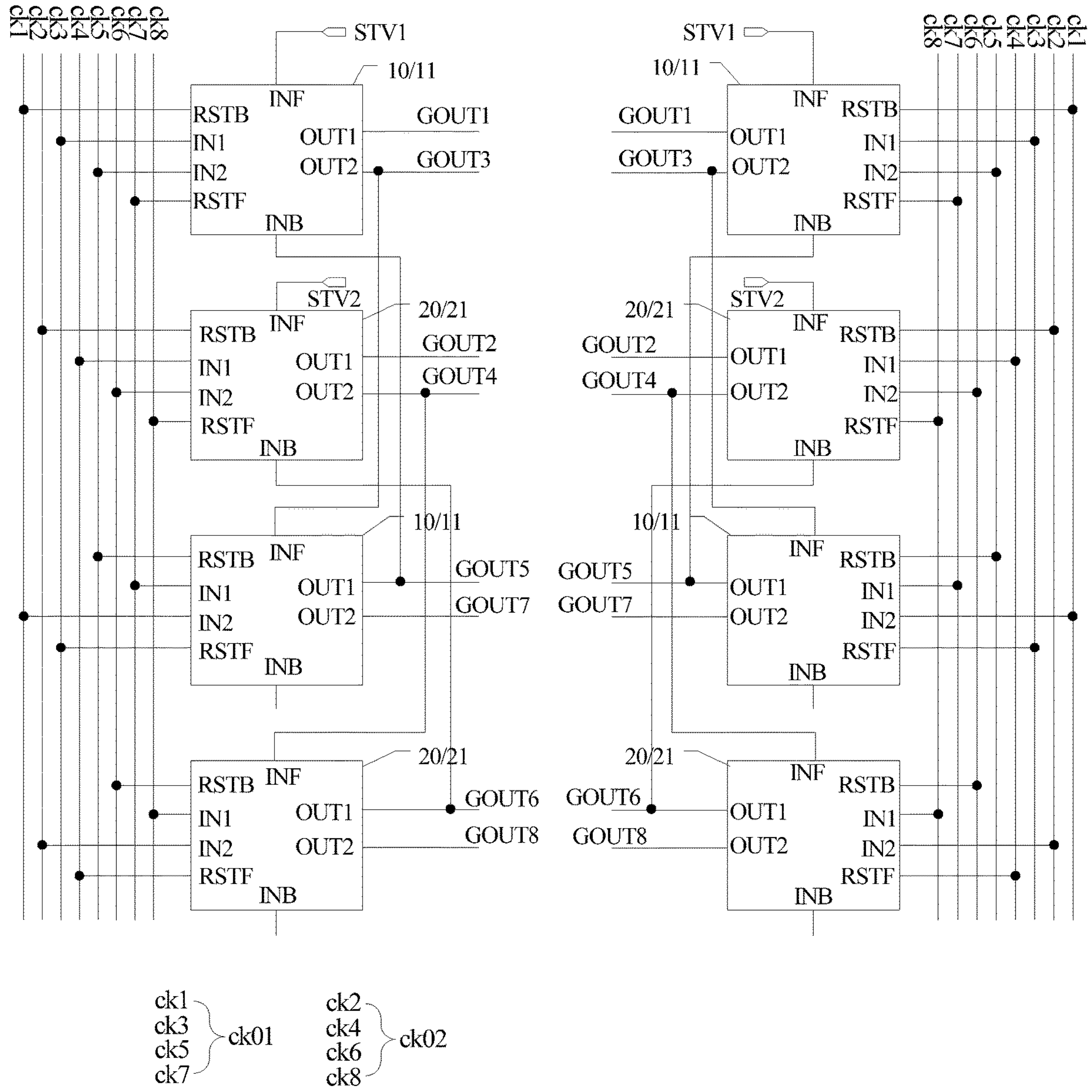
FIG. 7 is a detailed diagram of the connection between a gate drive unit group and a clock signal line and a scan line in FIG. 6.

FIG. 7 is a detailed diagram of the connection between a gate drive unit group and a clock signal line and a scan line S0 in FIG. 6. Referring to FIG. 7, in an embodiment of the present invention, the display panel also includes a first clock signal line group ck01 and a second clock signal line group ck02. The first clock signal line group ck01 includes multiple clock signal lines, and the second clock signal line group ck02 includes multiple clock signal lines. Clock signal lines (ck1, ck3, ck5, and ck7) in the first clock signal line group ck01 are electrically connected to a first gate drive unit 11. Clock signal lines (ck2, ck4, ck6, and ck8) in the second clock signal line group ck02 are electrically connected to a second gate drive unit 21. The first non-display region NA1 is provided with a first clock signal line group ck01 and a second clock signal line group ck02. The second non-display region NA2 is provided with a first clock signal line group ck01 and a second clock signal line group ck02.

When a scan line S0 is driven by using the bilateral driving method as shown in FIG. 6, a first gate drive unit group 10 and a second gate drive unit group 20 are disposed in each of the first non-display region NA1 and the second non-display region NA2. The first gate drive unit group 10 and the second gate drive unit group 20 are connected to different clock signal line groups. The first gate drive unit group 10 is connected to the clock signal line in the first clock signal line group ck01. The second gate drive unit group 20 is connected to the clock signal line in the second clock signal line group ck02. In this embodiment, a description is given by using an example in which the first clock signal line group ck01 includes clock signal lines ck1, ck3, ck5, and ck7, and the second clock signal line group ck02 includes clock signal lines ck2, ck4, ck6, and ck8. When a first gate drive unit group 10 and a second gate drive unit group 20 are disposed in each of the first non-display region NA1 and the second non-display region NA2, the first clock signal line group ck01 corresponding to the first gate drive unit group 10 and the second clock signal line group ck02 corresponding to the second gate drive unit group 20 are disposed in each of the first non-display region NA1 and the second non-display region NA2. In this manner, bilateral driving of a scan line S0 is implemented, and at the same time, it is beneficial to simplify the connection difficulty between the first gate drive unit group 10 and the first clock signal line group ck01 and the connection difficulty between the second gate drive unit group 20 and the second clock signal line group ck02.

Referring to FIGS. 6 and 7, in an embodiment of the present invention, in the first clock signal line group ck01, a clock signal line connected to a first driver circuit 111 and a clock signal connected to a second driver circuit 112 are at least partially different. In the second clock signal line group ck02, a clock signal line connected to a third driver circuit 213 and a clock signal connected to a fourth driver circuit 214 are at least partially different. In the first clock signal line group ck01, different clock signal lines transmit different clock signals, and in the second clock signal line group ck02, different clock signal lines transmit different clock signals.

It is to be noted that in the embodiments shown in FIGS. 6 and 7, GOUT1 refers to a scan signal transmitted to the first scan line S0 in the display region AA. GOUT2 refers to a scan signal transmitted to the second scan line S0 in the display region AA. GOUT3 refers to a scan signal transmitted to the third scan line S0 in the display region AA. GOUT4 refers to a scan signal transmitted to the fourth scan line S0 in the display region AA. The rest are done in the same manner.

Referring to FIGS. 6 and 7, in the figures, the terminals of a first gate drive unit 11 and a second gate drive unit 21 are illustrated in a modular form. The first gate drive unit 11 is used as an example. The output terminal OUT1 and output terminal OUT2 correspond to the output terminal of the first driver circuit 111 and the output terminal of the second driver circuit 112 respectively. The input terminal IN1 and input terminal IN2 correspond to the input terminal of the first driver circuit 111 and the input terminal of the second driver circuit 112 respectively. The input terminal IN1 and input terminal IN2 are connected to different clock signal lines in the first clock signal line group ck01. Thus, effective level signals may be input to the input terminal IN1 and input terminal IN2 of the first driver circuit 111 and input terminal IN1 and input terminal IN2 of the second driver circuit 112 in a time-sharing manner through different clock signal lines. Then, the first driver circuit 111 and the second driver circuit 112 in the first gate drive unit 11 are controlled to output effective level signals to corresponding scan lines S0 in a time-sharing manner.

Similarly, the second gate drive unit 21 is used as an example. The output terminal OUT1 and output terminal OUT2 correspond to the output terminal of the third driver circuit 213 and the output terminal of the fourth driver circuit 214 respectively. The input terminal IN1 and input terminal IN2 correspond to the input terminal of the third driver circuit 213 and the input terminal of the fourth driver circuit 214 respectively. The input terminal IN2 and input terminal IN2 are connected to different clock signal lines in the second clock signal line group ck02. Thus, effective level signals may be input to the input terminal IN1 and input terminal IN2 of the third driver circuit 213 and input terminal IN1 and input terminal IN2 of the fourth driver circuit 214 in a time-sharing manner through different clock signal lines. Then, the third driver circuit 213 and the fourth driver circuit 214 in the second gate drive unit 21 are controlled to output effective level signals to corresponding scan lines S0 in a time-sharing manner.

Figure 8:
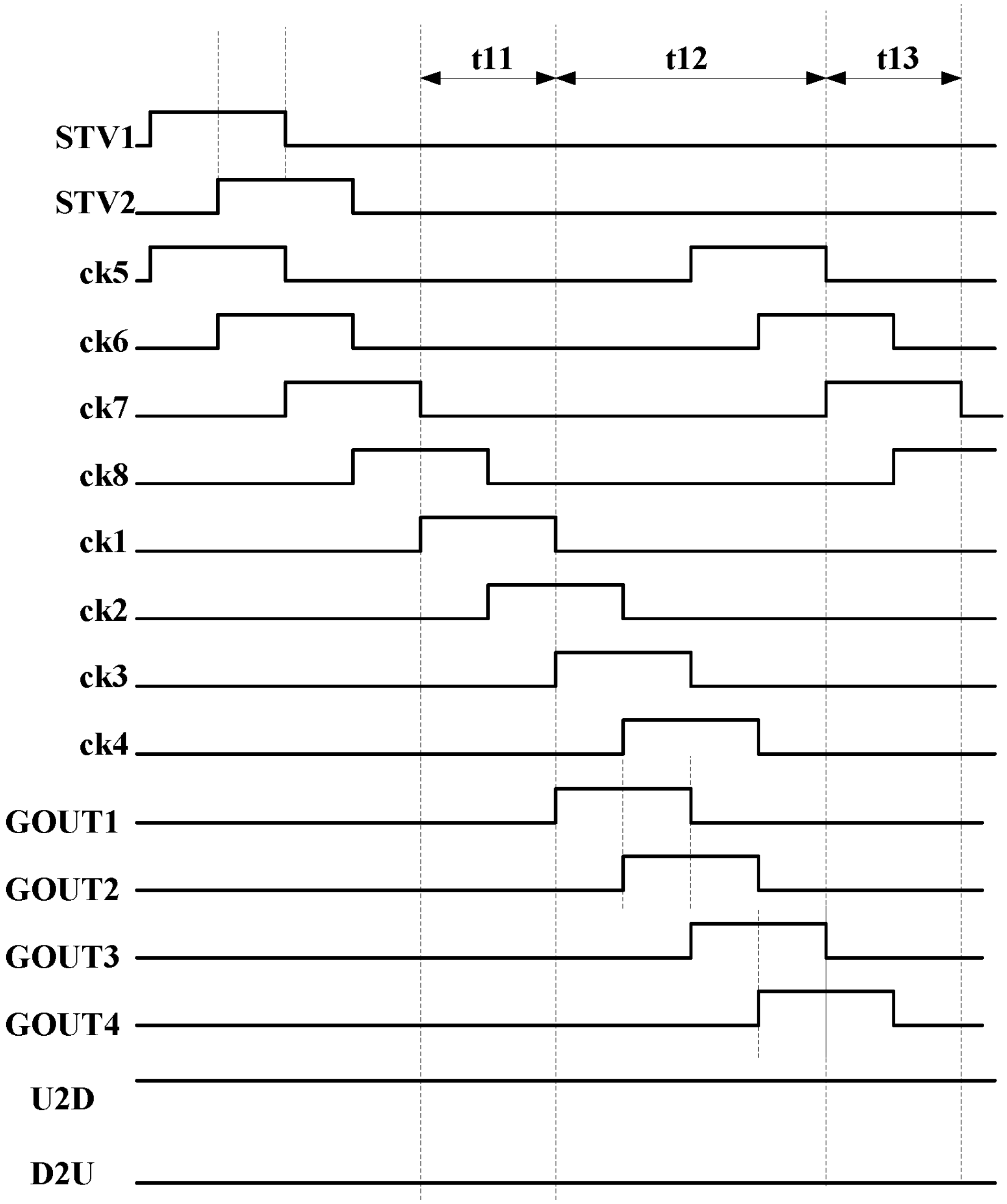
FIG. 8 is a working timing diagram of a circuit in FIG. 7.

FIG. 8 is a working timing diagram of a circuit in FIG. 7. Referring to FIG. 8, in an embodiment of the present invention, the first gate drive unit 11 at the first stage is connected to a first start trigger signal line STV1. The second gate drive unit 21 at the first stage is connected to a second start trigger signal line STV2. A period during which the first start trigger signal line STV1 sends an effective level signal to the first gate drive unit 11 at least partially overlaps a period during which the second start trigger signal line STV2 sends an effective level signal to the second gate drive unit 21.

Referring to FIGS. 7 and 8, in this embodiment, the odd-numbered scan line S0 is electrically connected to a first gate drive unit 11. The even-numbered scan line S0 is electrically connected to a second gate drive unit 21. The same scan line S0 is electrically connected to two driver circuits. A first gate drive unit 11 at the first stage and a second gate drive unit 21 at the first stage are connected to different start trigger signal lines. The first start trigger signal line STV1 is connected to the first gate drive unit 11 at the first stage. The second start trigger signal line STV2 is connected to the second gate drive unit 21 at the first stage. When the first start trigger signal line STV1 and the second start trigger signal line STV2 send effective level signals to the first gate drive unit 11 and the second gate drive unit 21, the corresponding first gate drive unit 11 and the second gate drive unit 21 start working. In this embodiment, when a period during which the first start trigger signal line STV1 sends an effective level signal is set to at least partially overlap a period during which the second start trigger signal line STV2 sends an effective level signal, the period during which the first scan line receives the effective level signal of a scan signal at least partially overlap the period during which the second scan line receives the effective level signal of a scan signal, and the period during which the third scan line receives the effective level signal of a scan signal overlaps the period during which the fourth scan line receives the effective level signal of a scan signal. The overlapping of the periods during which other scan lines receive effective level signals can be deduced in the same manner. In the same frame time, when the periods during which scan lines receive effective level signals overlap, the duration of an effective level signal transmitted from each driver circuit to a scan line may be extended to a certain extent. In this manner, it is beneficial to extend the charging duration of the scan line, thereby effectively alleviating the problem that there is a large difference between the charging efficiency of the far end and the charging efficiency of the near end of the scan line.

Figure 9:
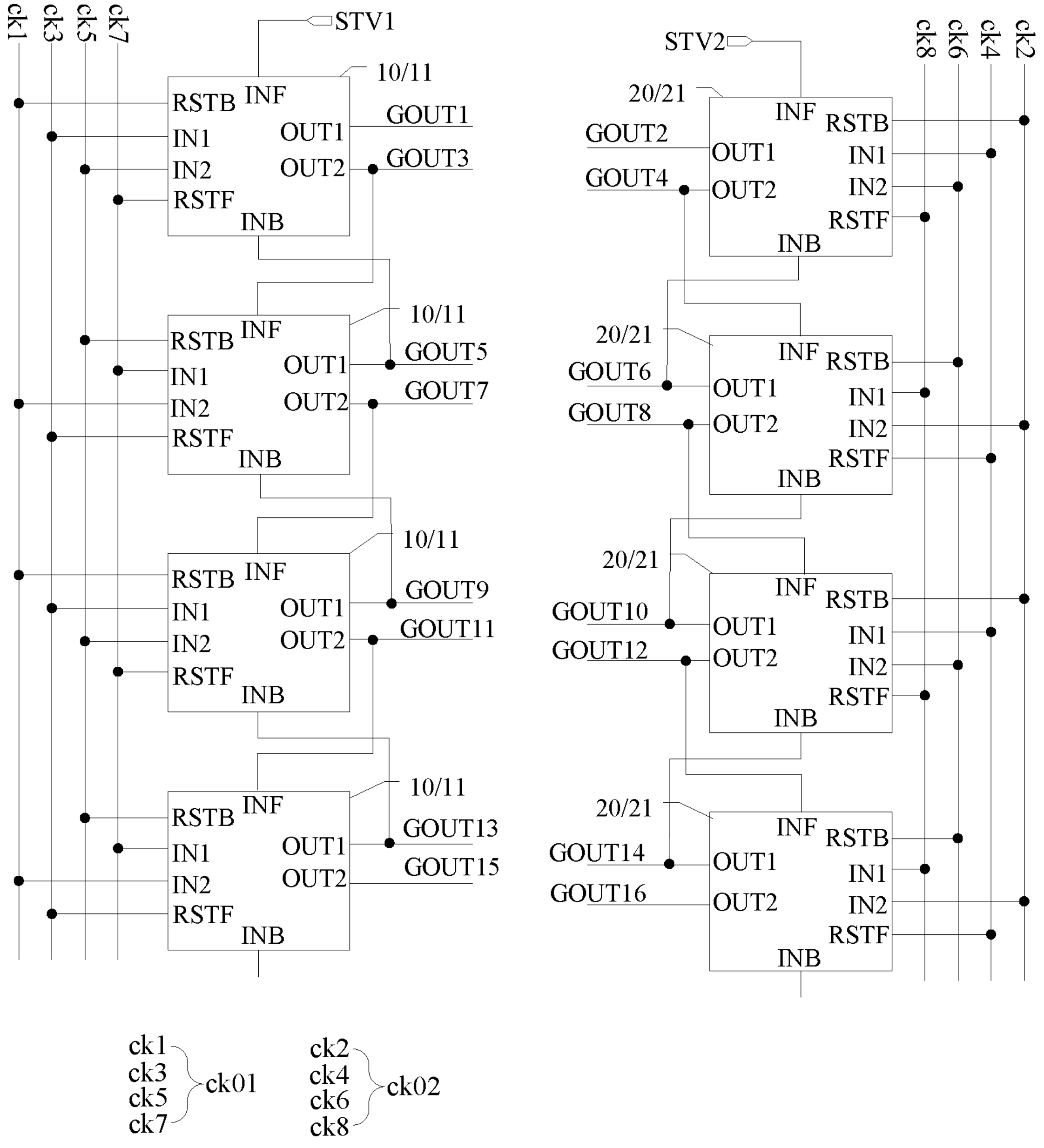
FIG. 9 is a detailed diagram of the connection between a gate drive unit group and a clock signal line and a scan line in FIG. 5.

FIG. 9 is a detailed diagram of the connection between a gate drive unit group and a clock signal line and a scan line S0 in FIG. 5. In combination with FIGS. 1, 5, and 9, in an embodiment of the present invention, the non-display region NA includes a first non-display region NA1 and a second non-display region NA2. The first non-display region NA1 and the second non-display region NA2 are located on two sides of the display region AA in the second direction D2. The first gate drive unit group 10 is located in the first non-display region NA1. The second gate drive unit group 20 is located in the second non-display region NA2. The first driver circuit 111, the second driver circuit 112, the third driver circuit 213, and the fourth driver circuit 214 are connected to different scan lines S0.

This embodiment shows a scheme in which only one gate drive unit group is disposed in the first non-display region NA1, and only one gate drive unit group is disposed in the second non-display region NA2. This embodiment shows a scheme in which the first gate drive unit group 10 is disposed in the first non-display region NA1, and the second gate drive unit group 20 is disposed in the second non-display region NA2. The first driver circuit 111 and the second driver circuit 112 in the first gate drive unit group 10 and the third driver circuit 213 and the fourth driver circuit 214 in the second gate drive unit group 20 are connected to different scan lines S0. One scan line S0 is connected to only one driver circuit, that is, the driver circuit drives the scan line S0 unilaterally. With respect to a unilateral driving circuit structure, it is also satisfied that a period during which a first gate drive unit 11 at the first stage transmits an effective level signal to a scan line S0 overlaps and a period during which a second gate drive unit 21 at the second stage transmits an effective level signal to a scan line S0. In this manner, the duration during which the driver circuit corresponding to each gate drive unit charges a scan line S0 is extended, so that it is also beneficial to alleviate the problem that there is a large difference between the charge capacity of the far end and the charge capacity of the near end of the scan line S0.

It is to be noted that the embodiment shown in FIG. 9 shows only a scheme in which a first gate drive unit group 10 is disposed in the first non-display region NA1, and a second gate drive unit group 20 is disposed in the second non-display region NA2. In some other embodiments of the present invention, a second gate drive unit group 20 may also be disposed in the first non-display region NA1, and a first gate drive unit group 10 is disposed in the first non-display region NA1. This is not limited in the present invention.

Further referring to FIG. 9, in an embodiment of the present invention, the display panel also includes a first clock signal line group ck01 and a second clock signal line group ck02. The first clock signal line group ck01 includes multiple clock signal lines, and the second clock signal line group ck02 includes multiple clock signal lines. Clock signal lines (ck1, ck3, ck5, and ck7) in the first clock signal line group ck01 are electrically connected to a first gate drive unit 11. Clock signal lines (ck2, ck4, ck6, and ck8) in the second clock signal line group ck02 are electrically connected to a second gate drive unit 21. The first clock signal line group ck01 is located in the first non-display region NA1. The second clock signal line group ck02 is located in the second non-display region NA2.

When a first gate drive unit group 10 is disposed in the first non-display region NA1, and a second gate drive unit group 20 is disposed in the second non-display region NA2, the first gate drive unit group 10 is connected to the first clock signal line group ck01, and the second gate drive unit 21 is connected to the second clock signal line group ck02. The first clock signal line group ck01 and the first gate drive unit group 10 connected thereto are disposed in the non-display region NA on the same side of the display region AA. In this embodiment, a description is given by using an example in which the first clock signal line group ck01 and the first gate drive unit group 10 connected thereto are disposed in the first non-display region NA1. The second clock signal line group ck02 and the second gate drive unit group 20 connected thereto are disposed in the non-display region NA on another side of the display region AA. In this embodiment, a description is given by using an example in which the second clock signal line group ck02 and the second gate drive unit group 20 connected thereto are disposed in the second non-display region NA2. In this manner, it is beneficial to simplify the connection difficulty between the first gate drive unit group 10 and the first clock signal line group ck01. At the same time, it is beneficial to simplify the connection difficulty between the second gate drive unit group 20 and the second clock signal line group ck02. Thus, the overall manufacturing process of the display panel is simplified.

In addition, since the first gate drive unit group 10 is disposed only in the first non-display region NA1, it is only necessary to dispose the first clock signal line group ck01 corresponding to the first gate drive unit group 10 in the first non-display region NA1, and it is not necessary to dispose other clock signal line groups in the first non-display region NA1. Thus, it is beneficial to reduce the number of clock signal line segments included in the first non-display region NA1, and it is beneficial to implement the design of the narrow bezel of the first non-display region NM. Similarly, since the second gate drive unit group 20 is disposed only in the second non-display region NA2, it is only necessary to dispose the second clock signal line group ck02 corresponding to the second gate drive unit group 20 in the second non-display region NA2, and it is not necessary to dispose other clock signal line groups in the second non-display region NA2. Thus, it is beneficial to reduce the number of clock signal line segments included in the second non-display region NA2, and it is beneficial to implement the design of the narrow bezel of the second non-display region NA2.

Further referring to FIG. 9, in an embodiment of the present invention, in the first clock signal line group ck01, a clock signal line connected to the first driver circuit 111 and a clock signal connected to the second driver circuit 112 are at least partially different. In the second clock signal line group ck02, a clock signal line connected to the third driver circuit 213 and a clock signal connected to the fourth driver circuit 214 are at least partially different. In the first clock signal line group ck01, different clock signal lines transmit different clock signals, and in the second clock signal line group ck02, different clock signal lines transmit different clock signals.

It is to be noted that in the embodiment shown in FIG. 9, GOUT1 refers to a scan signal transmitted to the first scan line S0 in the display region AA. GOUT2 refers to a scan signal transmitted to the second scan line S0 in the display region AA. GOUT3 refers to a scan signal transmitted to the third scan line S0 in the display region AA. GOUT4 refers to a scan signal transmitted to the fourth scan line S0 in the display region AA. The rest are done in the same manner.

Referring to FIGS. 5 and 9, in the figures, the terminals of a first gate drive unit 11 and a second gate drive unit 21 are illustrated in a modular form. The first gate drive unit 11 is used as an example. The output terminal OUT1 and output terminal OUT2 correspond to the output terminal of the first driver circuit 111 and the output terminal of the second driver circuit 112 respectively. The input terminal IN1 and input terminal IN2 correspond to the input terminal of the first driver circuit 111 and the input terminal of the second driver circuit 112 respectively. The input terminal IN1 and input terminal IN2 are connected to different clock signal lines in the first clock signal line group ck01. Thus, effective level signals may be input to the input terminal IN1 and input terminal IN2 of the first driver circuit 111 and input terminal IN1 and input terminal IN2 of the second driver circuit 112 in a time-sharing manner through different clock signal lines. Then, the first driver circuit 111 and the second driver circuit 112 in the first gate drive unit 11 are controlled to output effective level signals to corresponding scan lines S0 in a time-sharing manner.

Similarly, the second gate drive unit 21 is used as an example. The output terminal OUT1 and output terminal OUT2 correspond to the output terminal of the third driver circuit 213 and the output terminal of the fourth driver circuit 214 respectively. The input terminal IN1 and input terminal IN2 correspond to the input terminal of the third driver circuit 213 and the input terminal of the fourth driver circuit 214 respectively. The input terminal IN1 and input terminal IN2 are connected to different clock signal lines in the second clock signal line group ck02. Thus, effective level signals may be input to the input terminal IN2 and input terminal IN2 of the third driver circuit 213 and input terminal IN1 and input terminal IN2 of the fourth driver circuit 214 in a time-sharing manner through different clock signal lines. Then, the third driver circuit 213 and the fourth driver circuit 214 in the second gate drive unit 21 are controlled to output effective level signals to corresponding scan lines S0 in a time-sharing manner.

Figure 10:
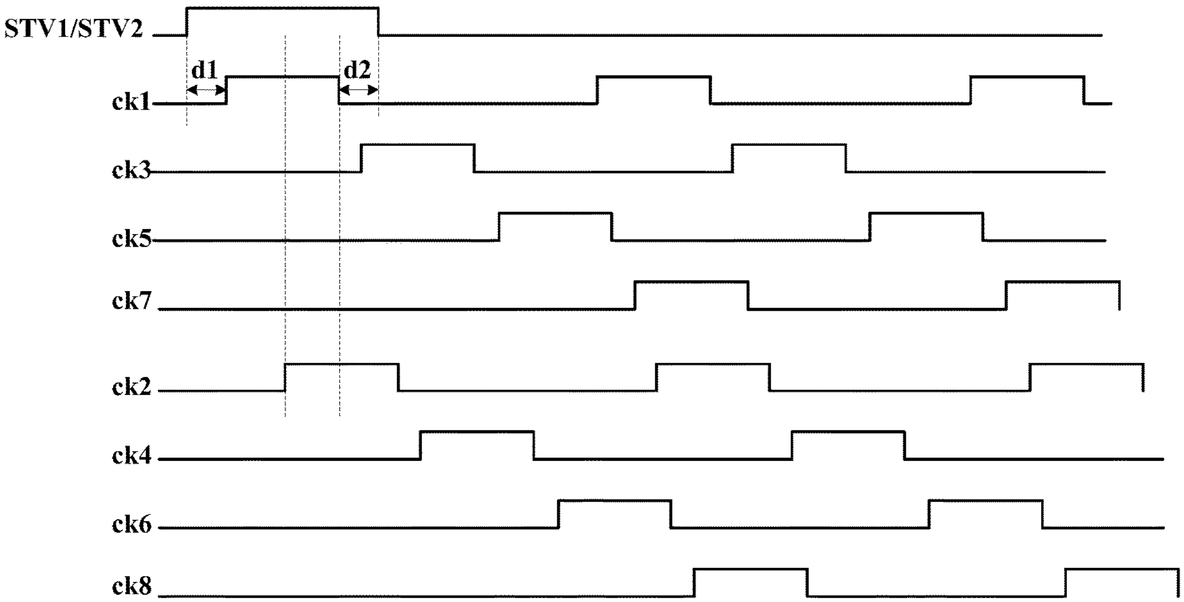
FIG. 10 is a working timing diagram of a circuit in FIG. 9.

FIG. 10 is a working timing diagram of a circuit in FIG. 9. Referring to FIGS. 9 and 10, in an embodiment of the present invention, the first gate drive unit 11 at the first stage is connected to the first start trigger signal line STV1. The second gate drive unit 21 at the first stage is connected to the second start trigger signal line STV2. The period during which the first start trigger signal line STV1 sends the effective level signal to the first gate drive unit 11 coincides with the period during which the second start trigger signal line STV2 sends the effective level signal to the second gate drive unit 21.

In an embodiment, in this embodiment of the present invention, the first gate drive unit 11 at the first stage is electrically connected to the first start trigger signal line STV1 and obtains a start trigger signal through the first start trigger signal line STV1. The second gate drive unit 21 at the first stage is electrically connected to the second start trigger signal line STV2 and obtains a start trigger signal through the second start trigger signal line STV2. In this embodiment, when the period during which the first start trigger signal line STV1 sends the effective level signal to the first gate drive unit 11 is set to coincide with the period during which the second start trigger signal line STV2 sends the effective level signal to the second gate drive unit 21, the first start trigger signal line STV1 and the second start trigger signal line STV2 may be connected the same signal terminal on a driver chip. Thus, it is beneficial to reduce the number of signal terminals actually included in the driver chip, and it is beneficial to reduce the costs of the driver chip.

When the period during which the first start trigger signal line STV1 sends the effective level signal to the first gate drive unit 11 coincides with the period during which the second start trigger signal line STV2 sends the effective level signal to the second gate drive unit 21, the start time of the first effective level signal ck1 sent by the clock signal line corresponding to the first gate drive unit 11 at the first stage and the start time of the first effective level signal ck2 sent by the clock signal line corresponding to the second gate drive unit 21 at the first stage are in the effective level period of the preceding start trigger signal and overlap the preceding effective level signal ck1. Thus, the effective level signal of the scan signal output to the first scan line S0 overlaps the effective level signal of the scan signal output to the second scan line S0 in the display panel. In a fixed frame time, the overlapping method of the effective level signals of scan lines S0 is conducive to extending the duration of the effective level signal received by each scan line S0. In this manner, it is beneficial to extend the charging duration of a single scan line S0, and it is beneficial to improve the charging efficiency of the scan line S0, thereby effectively alleviating the problem that there is a charging difference between the far end and the near end of the scan line S0.

Further referring to FIGS. 9 and 10, in an embodiment of the present invention, the duration during which the first start trigger signal line STV1 sends a single effective level signal to the first gate drive unit 11 is greater than the duration during which the first gate drive unit 11 transmits a single effective level signal to the corresponding scan line S0 or the duration during which the second gate drive unit 12 transmits a single effective level signal to the corresponding scan line S0.

In this embodiment, the width of the single effective level sent by the first gate drive unit 11 to a scan line S0 and the width of the single effective level sent by the second gate drive unit 21 to a scan line S0 are equal and smaller than the width of the single effective level sent by the first start trigger signal line STV1 and the width of the single effective level sent by the second start trigger signal line STV2. Referring to FIG. 10, the start time and end time of the first effective level signal ck1 sent by the clock signal line corresponding to the first gate drive unit 11 at the first stage are in the effective level period of the preceding start trigger signal. The interval width between the start time of the effective level signal ck1 and the start time of the effective level of a start trigger signal is d1, the interval width between the end time of the effective level signal ck1 and the end time of the effective level of the start trigger signal is d2, and d1=d2.

In this embodiment, the first start trigger signal line STV1 and the second start trigger signal line STV2 may be connected to the same signal terminal. The duration of the effective level signal sent by the first start trigger signal line STV1 and the duration of the effective level signal sent by the second start trigger signal line STV2 are extended, so that a first gate drive unit 11 at the first stage and a second gate drive unit 21 at the first stage are started stably. The effective level signal sent by the first gate drive unit 11 and the effective level signal sent by the second gate drive unit 21 are controlled to overlap, so that the duration of the effective level sent by the first gate drive unit 11 to a scan line S0 and the duration of the effective level sent by the second gate drive unit 21 to a scan line S0 are extended. In this manner, the charging efficiency of a scan line S0 is improved.

Referring to FIGS. 5 and 6, the internal structure of the first gate drive unit 11 and the internal structure of the second gate drive unit 21 provided by this embodiment of the present invention are the same. The second gate drive unit 21 may be regarded as a copy of the first gate drive unit 11. The structure of the first driver circuit 111 in the first gate drive unit 11 is the same as the structure of the third driver circuit 213 in the second gate drive unit 21. The structure of the second driver circuit 112 in the first gate drive unit 11 is the same as the structure of the fourth driver circuit 214 in the second gate drive unit 21. The specific circuit structure of a single first gate drive unit 11 or a single second gate drive unit 21 is described below.

Figure 11:
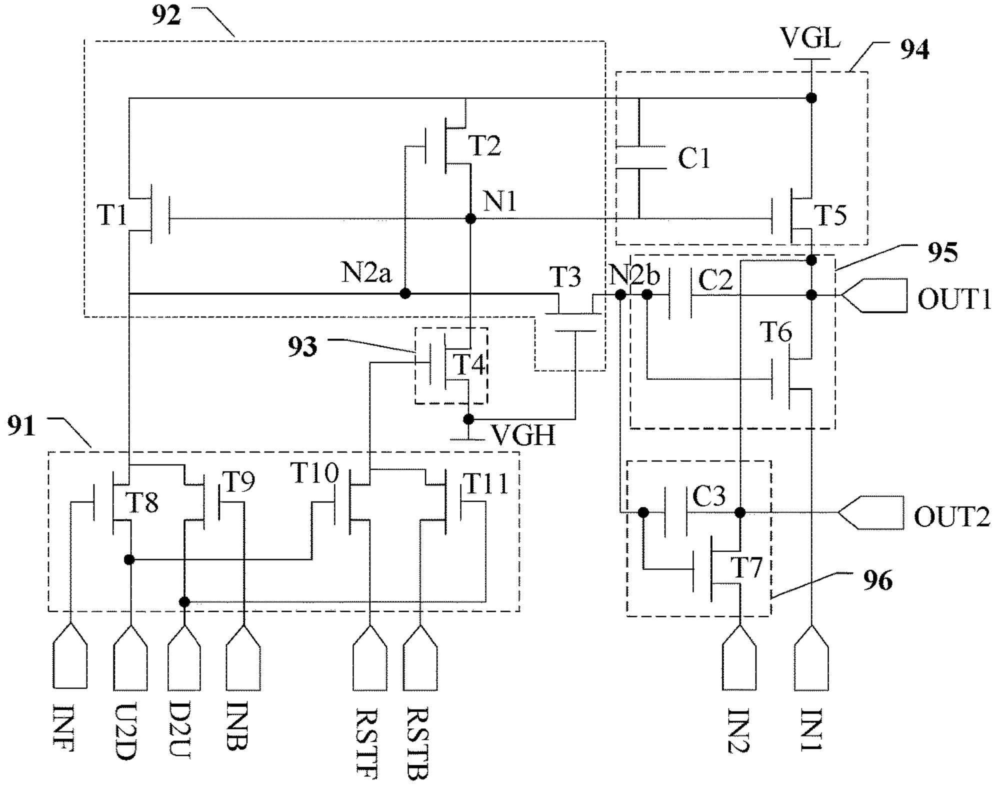
FIG. 11 is a diagram illustrating the circuit structure of a first gate drive unit or a second gate drive unit according to an embodiment of the present invention.

FIG. 11 is a diagram illustrating the circuit structure of a first gate drive unit 11 or a second gate drive unit 21 according to an embodiment of the present invention.

In combination with FIGS. 7, 9, and 11, in an optional embodiment of the present invention, each of the first gate drive unit 11 and the second gate drive unit 12 includes a scan control circuit 91, a node control circuit 92, a reset circuit 93, a first stage output circuit 94, a first output circuit 95, and a second output circuit 96. The scan control circuit 91 is connected to the node control circuit 92, the reset circuit 93, a forward input terminal INF, an inverse input terminal INB, a forward scan signal terminal U2D, an inverse scan signal terminal D2U, a first input terminal RSTF, and a second input terminal RSTB. The first stage output circuit 94 is electrically connected to the node control circuit 92, the first output circuit 95, the second output circuit 96, and a first stage terminal VGL. The node control circuit 92 is also electrically connected to the reset circuit 93, the first output circuit 95, and the second output circuit 96. The reset circuit 93 is also electrically connected to a second level terminal VGH. The first output circuit 95 is also connected to a third input terminal IN1 and a first output terminal OUT1. The second output circuit 96 is also connected to a fourth input terminal IN2 and a second output terminal OUT2.

In the first gate drive unit 11, the first driver circuit 111 and the second driver circuit 112 share the scan control circuit 91, the node control circuit 92, the reset circuit 93, and the first stage output circuit 94. The first driver circuit 111 also includes the first output circuit 95. The second driver circuit 112 also includes the second output circuit 96.

In the second gate drive unit 21, the third driver circuit 213 and the fourth driver circuit 214 share the scan control circuit 91, the node control circuit 92, the reset circuit 93, and the first stage output circuit 94. The third driver circuit 213 also includes the first output circuit 95. The fourth driver circuit 214 also includes the second output circuit 96.

It is to be noted that the forward scan signal terminal U2D and the inverse scan signal terminal D2U are not shown in FIGS. 7 and 9. Actually, a gate drive unit may include the forward scan signal terminal U2D and the inverse scan signal terminal D2U, and the two are connected to different signal lines. This embodiment shows a scheme in which in the same gate drive unit, the first stage output circuit 94 is shared by two driver circuits. In some other embodiments of the present invention, two driver circuits in the same gate drive unit may not share the first stage output circuit 94. This is not limited in the present invention.

Referring to FIG. 11, this embodiment shows the circuit structure corresponding to a gate drive unit. The first gate drive unit 11 and the second gate drive unit 21 mentioned in the present invention may refer to the structure. A single gate drive unit includes two driver circuits. The output terminals of the two driver circuits are connected to different scan lines S0. Further referring to FIG. 11, the scan control circuit 91, the node control circuit 92, the reset circuit 93, and the first stage output circuit 94 may be regarded as circuits shared by two driver circuits in a gate drive unit. Thus, the corresponding forward input terminal INF, inverse input terminal INB, forward scan signal terminal U2D, inverse scan signal terminal D2U, first input terminal RSTF and second input terminal RSTB, first stage terminal VGL, and second level terminal VGH are signal terminals shared and connected by two driver circuits in the gate drive unit. The two driver circuits in the gate drive unit share part of the circuits and share the connection terminals. Thus, it is beneficial to simplify the structure of a single gate drive unit and reduce the manufacturing complexity of the gate drive unit. In addition, the two driver circuits in the same gate drive unit share circuits, which is also beneficial to reduce the number of transistors actually included in the two driver circuits of the same gate drive unit and reduce the space occupied by the gate drive unit in the non-display region NA. Further, it is beneficial to implement the design of the narrow bezel of the display panel.

Further referring to FIG. 11, in the structure corresponding to a gate drive unit, the first output circuit 95 and the second output circuit 96 correspond to two driver circuits of the gate drive unit respectively. The first output circuit 95 may be regarded as a component of one of the driver circuits. The second output circuit 96 may be regarded as a component of the other driver circuit. In the practical application, the scan control circuit 91, the node control circuit 92, the reset circuit 93, and the first stage output circuit 94 control the output of the first output circuit OUT1 and the second output circuit OUT2 in a time-sharing manner. The signal output by the first output circuit OUT1 may be a signal of the first stage terminal VGL or a signal corresponding to the input terminal IN1. The signal output by the second output circuit OUT2 may be a signal of the first stage terminal VGL or a signal corresponding to the input terminal IN2.

Figure 12:
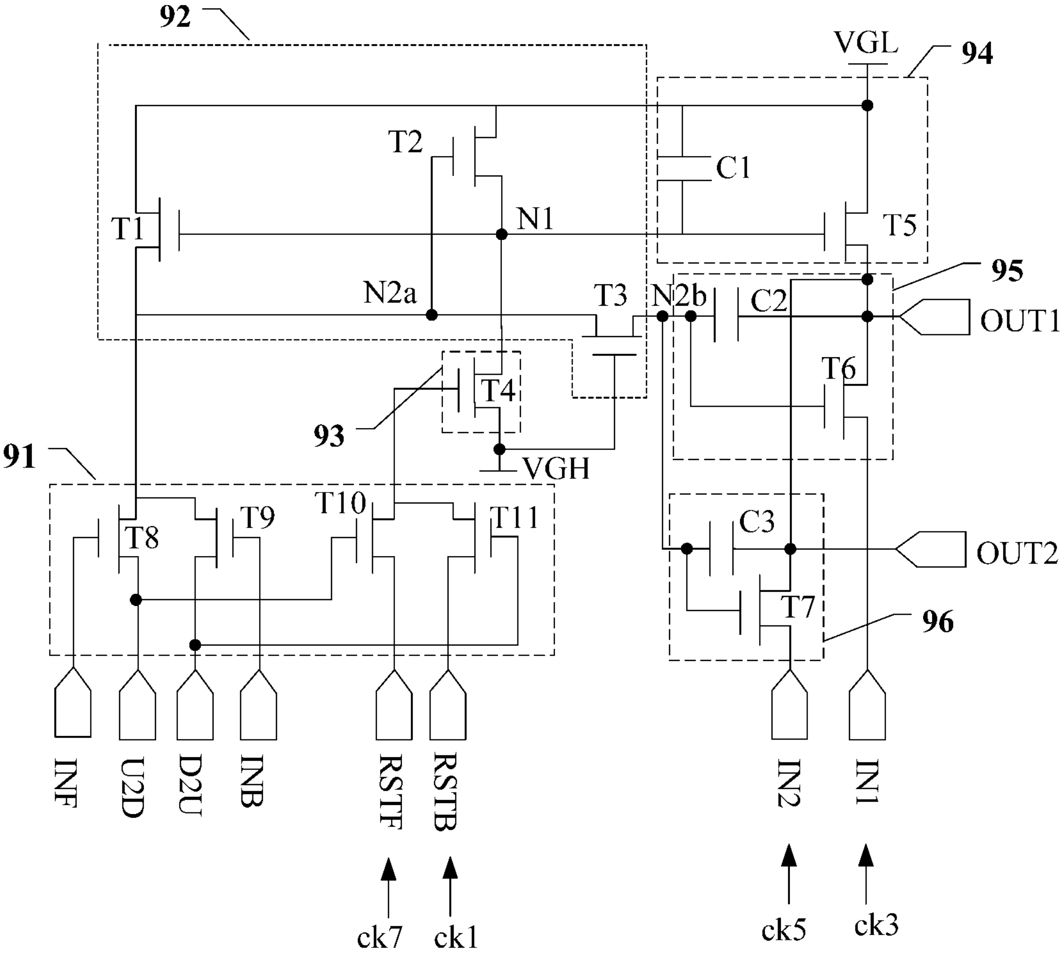
FIG. 12 is a signal corresponding diagram when a gate drive unit in FIG. 11 is applied to a first gate drive unit shown in FIG. 7.

FIG. 12 is a signal corresponding diagram when a gate drive unit in FIG. 11 is applied to a first gate drive unit 11 shown in FIG. 7. A description is given with reference to FIG. 2 by using an example in which transistors in a gate drive unit are all n-type transistors. The gate of an n-type transistor is turned on under the control of a high-level signal and turned off under the control of a low-level signal. In some other embodiments of the present invention, the transistors in a gate drive unit may also be embodied as p-type transistors. The gate of a p-type transistor is turned on under the control of a low-level signal and turned off under the control of a high-level signal. This is not limited in the present invention.

In combination with FIGS. 7, 8, and 12, in FIG. 8, only the timing in a forward scan mode is used as an example for description. The working process of the gate drive unit includes the stages below.

In the first stage t11: in a forward scan mode, a clock signal input terminal ck1 outputs an effective level signal, and a clock signal input terminal ck7 does not output an effective level signal. The scan control circuit 91 provides a forward scan signal U2D to a second node N2*a* under the signal control of the forward input terminal INF. The node control circuit 92 transmits a forward scan signal U2D to the first output circuit 95 and the second output circuit 96 and does not transmit the clock signal of the clock signal input terminal ck1 under the control of an inverse scan signal D2U. It is to be noted that in the forward scan mode, the forward scan signal U2D is a constant high-level signal, and the inverse scan signal D2U is a constant low-level signal.

In an inverse scan mode, the clock signal input terminal ck7 outputs an effective level signal, and the clock signal input terminal ck1 does not output an effective level signal. The scan control circuit 91 provides an inverse scan signal D2U to a second node N2*a* under the signal control of the inverse input terminal INB. The node control circuit 92 transmits an inverse scan signal D2U to the first output circuit 95 and the second output circuit 96 and does not transmit the clock signal of the clock signal input terminal ck7 under the control of a forward scan signal U2D. It is to be noted that in the inverse scan mode, the forward scan signal U2D is a constant low-level signal, and the inverse scan signal D2U is a constant high-level signal.

In the second stage t12: in a forward scan mode, the first output circuit 95 transmits the clock signal of a clock signal input terminal ck3 to the first output terminal OUT1 under the control of the signal of a third node N2*b*, and GOUT1 outputs the effective level signal corresponding to the clock signal input terminal ck3. The second output circuit 96 transmits the signal of a clock signal input terminal ck5 to the second output terminal OUT2 under the control of the signal of the third node N2*b*, and GOUT3 outputs the effective level signal corresponding to the clock signal input terminal ck5.

In an inverse scan mode, the second output circuit 96 transmits the signal of a clock signal input terminal ck5 to the second output terminal OUT2 under the control of the signal of the third node N2*b*, and the first output circuit 95 transmits the clock signal of the clock signal input terminal ck3 to the first output terminal OUT1 under the control of the signal of the third node N2*b*.

In the third stage t13: in a forward scan mode, the clock signal input terminal ck1 does not output an effective level signal, and the clock signal input terminal ck7 outputs an effective level signal. The scan control circuit 91 uses a forward scan signal U2D to control the clock signal of the clock signal input terminal ck7 to transmit to the reset circuit 93. The reset circuit 93 transmits the signal of the second level terminal VGH to a first node N1 under the control of the preceding clock signal. The node control circuit 92 transmits the high-level signal of the first node N1 to the first stage output circuit 94, so that the first stage output circuit 94 is controlled by the high-level signal of the first node N1, and the signal of the first stage terminal VGL is transmitted to the first output terminal OUT1 or the second output terminal OUT2. Thus, GOUT1 and GOUT3 output low-level signals.

In an inverse scan mode, the clock signal input terminal ck1 outputs an effective level signal, and the clock signal input terminal ck7 does not output an effective level signal. The scan control circuit 91 uses an inverse scan signal D2U to control the clock signal of the clock signal input terminal ck1 to transmit to the reset circuit 93. The reset circuit 93 transmits the signal of the second level terminal VGH to the first node N1 under the control of the preceding clock signal. The node control circuit 92 transmits the high-level signal of the first node N1 to the first stage output circuit 94, so that the first stage output circuit 94 is controlled by the high-level signal of the first node N1, and the signal of the first stage terminal VGL is transmitted to the first output terminal OUT1 or the second output terminal OUT2.

For the working stage of a second gate drive unit, reference may be made to the working stages of the first gate drive unit described above, and the details are not repeated in the present invention.

The specific circuit configuration of a gate drive unit is described below.

Further referring to FIG. 11, in an embodiment of the present invention, the node control circuit 92 includes a first transistor T1, a second transistor T2, and a third transistor T3. The gate of the first transistor T1 is connected to the first node N1. A first electrode of the first transistor T1 is connected to the first stage terminal VGL. A second electrode of the first transistor T1 is connected to the second node N2*a*. The gate of the second transistor T2 is connected to the second node N2*a*. A first electrode of the second transistor T2 is connected to the first stage terminal VGL. A second electrode of the second transistor T2 is connected to the first node N1. The gate of the third transistor T3 is connected to the second level terminal VGH. A first electrode of the third transistor T3 is connected to the second node N2*a*.

The reset circuit 93 includes a fourth transistor T4. The gate of the fourth transistor T4 is connected to the scan control circuit 91. A first electrode of the fourth transistor T4 is connected to the second level terminal VGH. A second electrode of the fourth transistor T4 is connected to the first node N1.

The first stage output circuit 94 includes a fifth transistor T5 and a first capacitor C1. The gate of the fifth transistor T5 is connected to the first node N1. A first electrode of the fifth transistor T5 is connected to the first stage terminal VGL. A second electrode of the fifth transistor T5 is connected to the first output terminal OUT1 and the second output terminal OUT2. The first capacitor C1 is connected between the first stage terminal VGL and the first node N1. The introduction of the first capacitor C1 is beneficial to improve the stability of the potential of the first node N1.

The first output circuit 95 includes a sixth transistor T6 and a second capacitor C2. The gate of the sixth transistor T6 is connected to the third node N2*b*. A first electrode of the sixth transistor T6 is connected to the third input terminal IN1. A second electrode of the sixth transistor T6 is connected to the first output terminal OUT1. The second capacitor C2 is connected between the third node N2*b* and the first output terminal OUT1. The first output terminal OUT1 is the output terminal of one driver circuit of a gate drive unit. The introduction of the second capacitor C2 is beneficial to improve the stability of the signal output by the first output circuit 95.

The second output circuit 96 includes a seventh transistor T7 and a third capacitor C3. The gate of the seventh transistor T7 is connected to the third node N2*b*. A first electrode of the seventh transistor T7 is connected to a fourth input terminal IN2. A second electrode of the seventh transistor T7 is connected to the second output terminal OUT2. The third capacitor C3 is connected between the third node N2*b* and the second output terminal OUT2. The second output terminal OUT2 is the output terminal of the other driver circuit of the gate drive unit. The introduction of the third capacitor C3 is beneficial to improving the stability of the signal output by the second output circuit 96.

The scan control circuit 91 includes an eighth transistor T8, a ninth transistor T9, a tenth transistor T10, and an eleventh transistor T11. The gate of the eighth transistor T8 is connected to the forward input terminal INF. A first electrode of the eighth transistor T8 is connected to the forward scan signal terminal U2D. A second electrode of the eighth transistor T8 is connected to the second node N2*a*. The gate of the ninth transistor T9 is connected to the inverse input terminal INB. A first electrode of the ninth transistor T9 is connected to the inverse scan signal terminal D2U. A second electrode of the ninth transistor T9 is connected to the second node N2*a*. The gate of the tenth transistor T10 is connected to the forward scan signal terminal U2D. A first electrode of the tenth transistor T10 is connected to the first input terminal RSTF. A second electrode of the tenth transistor T10 is connected to the gate of the fourth transistor T4. The gate of the eleventh transistor T11 is connected to the inverse scan signal terminal D2U. A first electrode of the eleventh transistor T11 is connected to the second input terminal RSTB. A second electrode of the eleventh transistor T11 is connected to the gate of the fourth transistor T4.

It is to be noted that in this embodiment, a description is given by using an example in which each transistor is an n-type transistor. The gate of an n-type transistor is turned on under the control of a high-level signal and turned off under the control of a low-level signal. In some other embodiments of the present invention, the type of transistor in a gate drive unit may also be embodied as a p-type. The gate of a p-type transistor is turned on under the control of a low-level signal and turned off under the control of a high-level signal. When the type of each transistor in the gate drive unit is configured to be consistent, each transistor may be manufactured in the same manufacturing process. It is beneficial to reduce the manufacturing complexity of the gate drive unit. The transistor mentioned in this embodiment of the present invention may be a thin-film transistor or a metal oxide-semiconductor field effect transistor. This is not limited in the present invention.

Referring to FIGS. 7 and 9, in an embodiment of the present invention, among cascaded first gate drive units 11, a second output terminal OUT2 of the second driver circuit 112 in a first gate drive unit 11 at this stage is connected to the forward input terminal INF of a first gate drive unit 11 at the next stage. The inverse input terminal INB of the first gate drive unit 11 at this stage is connected to a first output terminal OUT1 of the first driver circuit 111 in the first gate drive unit 11 at the next stage.

Among cascaded second gate drive units 21, a second output terminal OUT2 of the second driver circuit 112 in a second gate drive unit 21 at this stage is connected to the forward input terminal INF of a second gate drive unit 21 at the next stage. The inverse input terminal INB of the second gate drive unit 21 at this stage is connected to a first output terminal OUT1 of the first driver circuit 111 in the second gate drive unit 21 at the next stage.

It is to be noted that the forward input terminal INF of a first gate drive unit 11 at the first stage is connected to the first start trigger signal line STV1. The forward input terminal of a second gate drive unit 21 at the first stage is connected to the second start trigger signal line STV2.

It is to be noted that in the embodiment shown in FIG. 7, in the same non-display region NA, a first gate drive unit 11 and a second gate drive unit 21 are arranged alternately. That is, cascaded first gate drive units 11 are interspersed with second gate drive units 21. Cascaded second gate drive units 21 are interspersed with first gate drive units 11. In the embodiment shown in FIG. 9, first gate drive unit units 11 are all disposed in the first non-display region NA1, and second gate drive unit units 21 are all disposed in the second non-display region NA2.

In the preceding cascade mode, a first gate drive unit 11 and a second gate drive unit 21 are individually controlled, so that each of two driver circuits in the first gate drive unit 11 is electrically connected to the odd-numbered scan line and transmits a scan signal to the corresponding scan line, and each of two driver circuits in the second gate drive unit is electrically connected to the even-numbered scan line and transmits a scan signal to the corresponding scan line. At the same time, the period during which clock signal lines transmit effective level signals to a first gate drive unit 11 and a second gate drive unit respectively is controlled, so that the effective level signal transmitted by the first gate drive unit 11 to a scan line overlaps the effective level signal transmitted by the second gate drive unit to a scan line. In this manner, the duration of the effective level signal transmitted to each scan line is increased, the charging time of the scan line is prolonged, and it is beneficial to improve the charging efficiency of the scan line.

Referring to FIGS. 7, 9, and 11, in an embodiment of the present invention, in the same first gate drive unit 11, a first input terminal RSTF, a second input terminal RSTB, a third input terminal IN1, and a fourth input terminal IN2 corresponding to the first driver circuit 111 and the second driver circuit 112 are connected to different clock signal lines. In the same second gate drive unit, a first input terminal RSTF, a second input terminal RSTB, a third input terminal IN1, and a fourth input terminal IN2 corresponding to the first driver circuit 111 and the second driver circuit 112 are connected to different clock signal lines. The first gate drive unit 11 and the second gate drive unit correspond to different clock signal lines.

Further referring to FIGS. 7 and 9, a third input terminal IN1 corresponding to a gate drive unit is connected to a first output circuit 95 corresponding to one driver circuit of the gate drive unit. A fourth input terminal IN2 is connected to a second output circuit 96 corresponding to the other driver circuit of the gate drive unit. When the third input terminal IN1 and the fourth input terminal IN are connected to different clock signal lines, effective level signals may be input to the third input terminal IN1 and the fourth output terminal IN in a time-sharing manner through the different clock signal lines. In this manner, the same gate drive unit is controlled to output scan signals to the two scan lines connected thereto in a time-sharing manner. In a gate drive unit, the first input terminal RSTF and the second input terminal RSTB are used to control the output signal of the scan control circuit 91 in the forward scan stage and the output signal of the scan control circuit 91 in the inverse scan stage respectively. When the first input terminal RSTF and the second input terminal RSTB are connected to different clock signal lines, the gate drive unit can control the signals output by the scan control circuit during the forward scan stage and reverse scan stage, thereby implementing the forward scan function and the inverse scan function of the gate drive unit.

Figure 13:
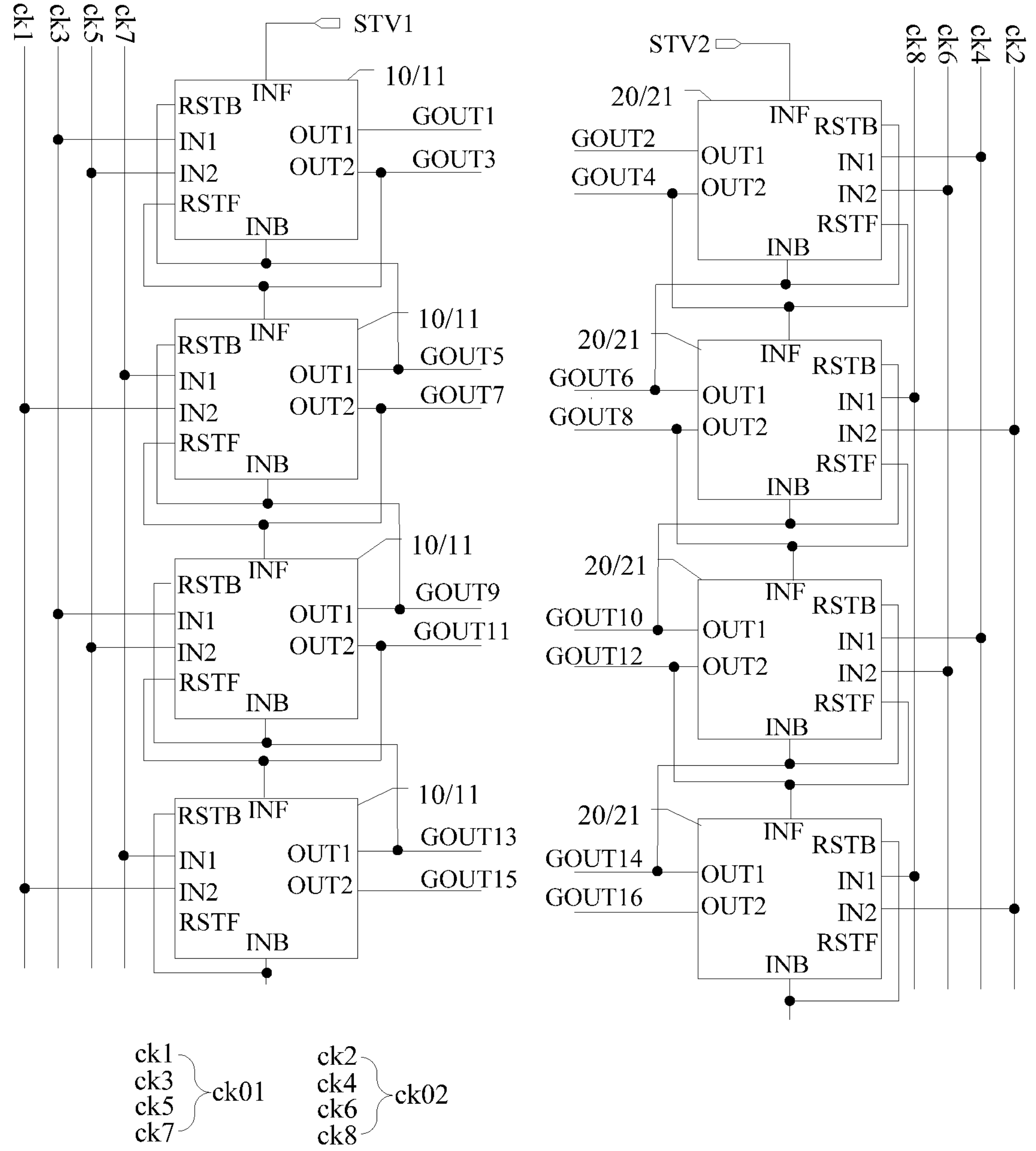
FIG. 13 is another detailed diagram of the connection between a gate drive unit group and a clock signal line and a scan line in FIG. 5.
Figure 14:
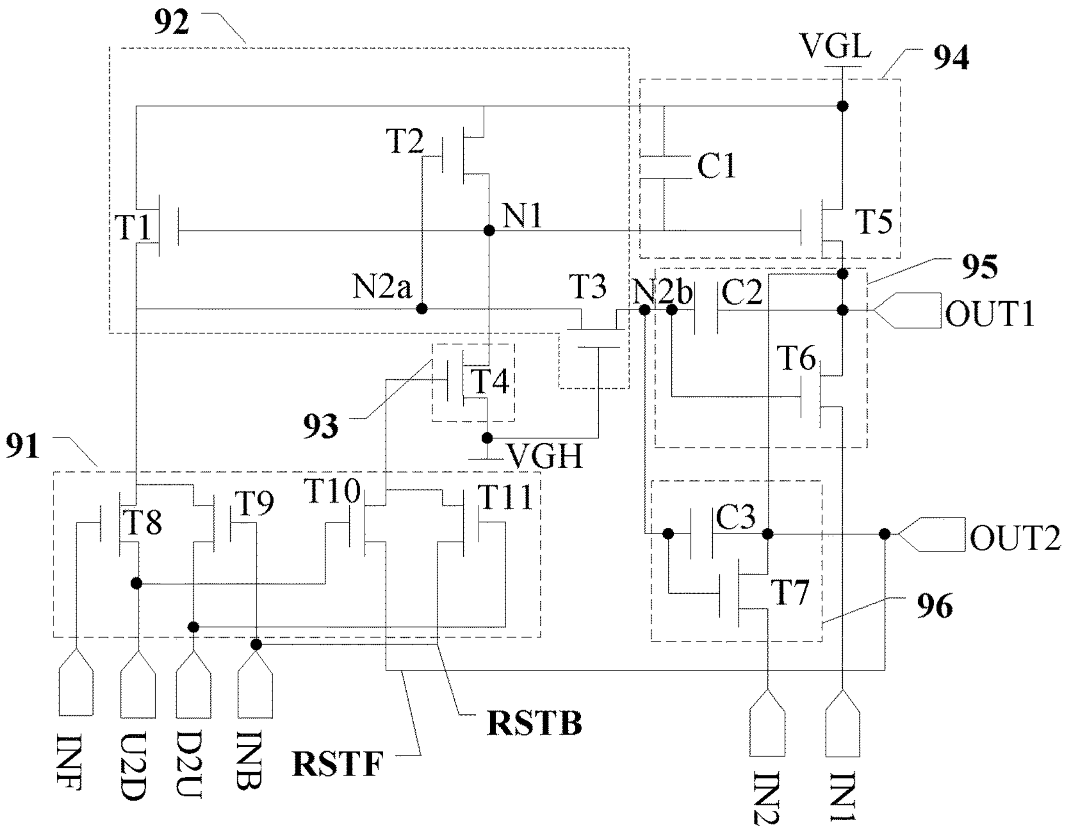
FIG. 14 is a diagram illustrating the circuit structure of a gate drive unit in FIG. 13.

FIG. 13 is another detailed diagram of the connection between a gate drive unit group and a clock signal line and a scan line in FIG. 5. FIG. 14 is a diagram illustrating the circuit structure of a gate drive unit in FIG. 13.

Referring to FIGS. 13 and 14, in an embodiment of the present invention, in the same first gate drive unit 11, the first input terminal RSTF is electrically connected to the second output terminal OUT2, and the second input terminal RSTB is electrically connected to the inverse input terminal INB. In the same second gate drive unit, the first input terminal RSTF is electrically connected to the second output terminal OUT2, and the second input terminal RSTB is electrically connected to the inverse input terminal INB.

This embodiment simplifies the structure of the gate drive unit. In the gate drive unit, the first input terminal RSTF is connected to the second output terminal OUT2. The first input terminal RSTF no longer needs to be led out and connected to a clock signal line. Similarly, the second input terminal RSTB is connected to the inverse input terminal INB. The second input terminal RSTB and the inverse input terminal INB are jointly connected to a clock signal line. Thus, the number of signal terminals led out by a single gate drive unit is reduced. At the same time, the number of signal terminals connected to the gate drive unit and a clock signal line is reduced. Moreover, it is beneficial to simplify the connection complexity between a gate drive unit and a signal line in the display panel.

Figure 15:
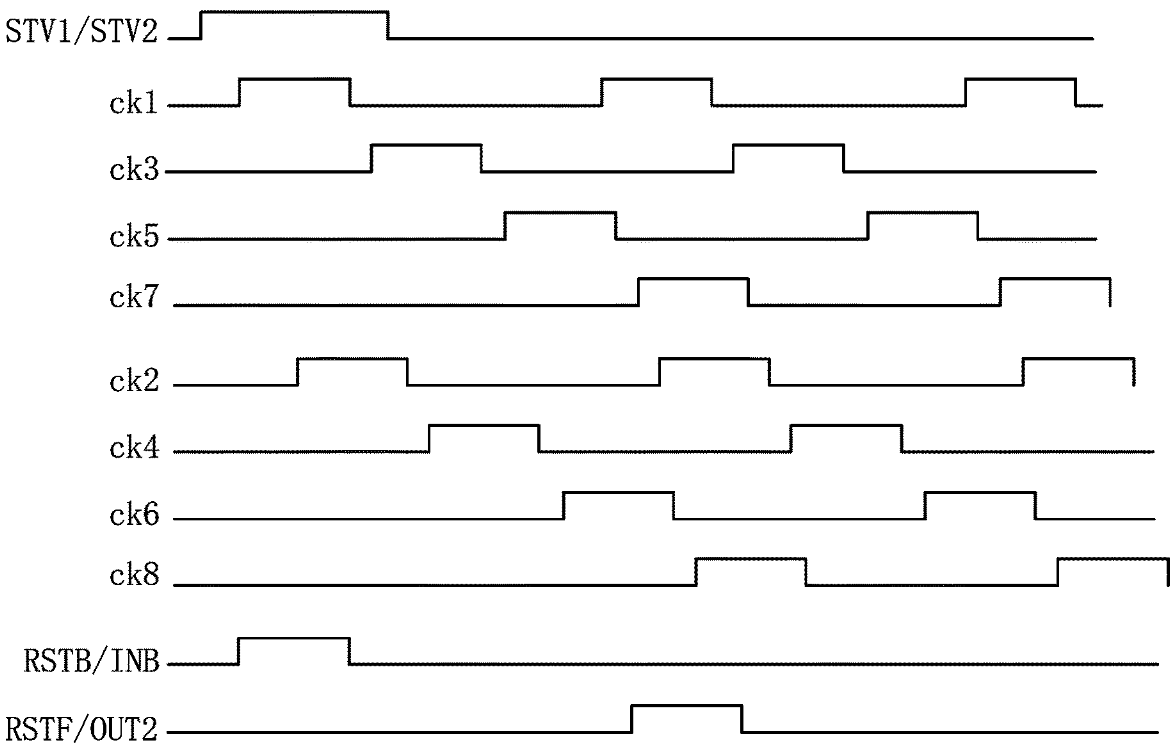
FIG. 15 is a working timing diagram of a circuit in FIG. 14.

FIG. 15 is a working timing diagram of a circuit in FIG. 14. In this embodiment, the pulse signal of the first input terminal RSTF and the pulse signal of the second input terminal RSTB are illustrated. Referring to FIG. 14, the first input terminal RSTF and the second input terminal RSTB are configured to provide reset control signals to the reset circuit 93. When the effective pulse signal of the first input terminal RSTF or the effective pulse signal of the second input terminal RSTB is transmitted to the reset circuit 93, the reset circuit 93 can transmit a high-level signal VGH to the first node N1 to reset the first node N1.

When the first input terminal RSTF is not connected to the second output terminal OUT2, and the second input terminal RSTB is not connected to the inverse input terminal INB, for example, referring to FIG. 12, the first input terminal RSTF receives a signal of the clock signal terminal ck7, and the second input terminal RSTB receives a signal of the clock signal terminal ck1. The signals of the clock signal terminal ck1 and the clock signal terminal ck7 send effective level signals every once in a while. The timing shown in FIG. 8 is used as an example. The duration of the ineffective level signal between the two effective pulse signals of the clock signal terminal ck7 is three times the duration of a single effective level signal (the duration of the single effective level sent by a clock signal terminal in the timing diagram may be regarded as the charging duration of the scan line corresponding to a row of sub-pixels). At this time, the first input terminal RSTF or the second input terminal RSTB sends an effective level signal once every four rows of sub-pixels. Each time an effective level signal is sent, the first node N1 is reset. That is, the first node N1 is reset every four rows of sub-pixels through the signal sent by the first input terminal RSTF or the second input terminal RSTB.

In this embodiment of the present invention, when the first input terminal RSTF is connected to the second output terminal OUT2, and the second input terminal RSTB is connected to the inverse input terminal INB, the pulse signal of the first input terminal RSTF and the pulse signal of the second input terminal RSTB are shown in FIG. 15. The pulse signal of the first input terminal RSTF and the pulse signal of the second input terminal RSTB include only one effective pulse signal. That is, in a frame time, the signal of the first input terminal RSTF and the signal of the second input terminal RSTB need to reset the first node N1 only once. Compared with the method of resetting every four rows, it is beneficial to save the power consumption of the display panel.

Figure 16:
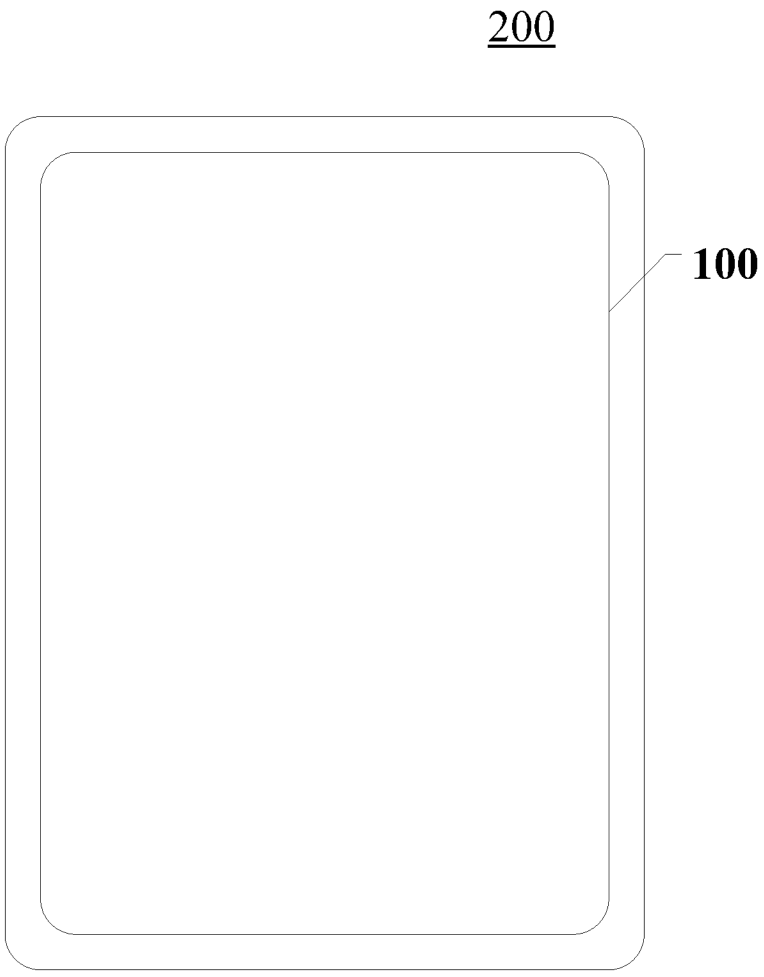
FIG. 16 is a diagram of a display device according to an embodiment of the present application.

Based on the same inventive concept, the present invention also provides a display device. FIG. 16 is a diagram of a display device according to an embodiment of the present application. Referring to FIG. 16, the display device 200 includes the display panel 100. The display panel is any display panel 100 provided by the present application.

It is to be noted that for the embodiment of the display device provided by this embodiment of the present application, reference may be made to the preceding embodiments of the display panel, and the details are not repeated here. The display device provided by the present application may be any product and component having display functions, such as a mobile phone, a tablet computer, a television, a display, a notebook computer, an in-vehicle display, and a navigator. The display device provided in this embodiment of the present invention has the beneficial effect of the display panel provided in the embodiments of the present invention. For details, reference may be made to the specific description of the display panel in the preceding embodiments, and the details are not repeated in this embodiment.

As can be seen from the preceding embodiments, the display panel and the display device provided by the present invention at least implement the beneficial effects below.

In the display panel and the display device provided by the present invention, the first gate drive unit in the first gate drive unit group and the second gate drive unit in the second gate drive unit group are connected to different scan lines for transmitting scan signals to the scan lines. A scan signal includes an effective level signal. A scan line is electrically connected to a transistor in the display panel. When the transistor is turned on, a data signal can be transmitted to a corresponding sub-pixel to implement the display function. The effective level signal in the scan signal refers to a signal that can control the transistor connected to the scan line to turn on. In the present invention, the period during which the first gate drive unit at the first stage transmits the effective level signal to the corresponding scan line is the first period. The period during which the second gate drive unit at the first stage transmits the effective level signal to the corresponding scan line is the second period. The first period and the second period overlap, and the overlap duration is greater than 0. In a frame time, when the first period and the second period overlap, and the overlap duration is greater than 0, it is beneficial to extend the duration during which the first gate drive unit sends the effective level to the corresponding scan line and the duration during which the second gate drive unit sends the effective level to the corresponding scan line respectively. That is, it is beneficial to extend the charging duration of a scan line. Thus, the charge capacity of the scan line is effectively improved by extending the charging duration, and it is beneficial to improve the consistency of the charge capacity of the far end and the charge capacity of the near end of the scan line, thereby improving the overall display effect of a display product.

While some specific embodiments of the present invention have been described in detail through examples, it should be understood by those skilled in the art that the preceding examples are for illustration only and are not intended to limit the scope of the present invention. It should be understood by those skilled in the art that modifications may be made to the preceding embodiments without departing from the scope and spirit of the present invention. The scope of the present invention is defined by the scope of the appended claims.

What is claimed is:

1. A display panel, comprising:

a display region and a non-display region at least partially surrounding the display region;

a plurality of scan lines located in the display region; and gate drive unit groups located in the non-display region, wherein the gate drive unit groups comprises at least one first gate drive unit group and at least one second gate drive unit group, a first gate drive unit group of the at least one first gate drive unit group comprises a plurality of first gate drive units which are cascaded, a second gate drive unit group of the at least one second gate drive unit group comprises a plurality of second gate drive units which are cascaded, the plurality of first gate drive units and the plurality of second gate drive units are connected to different scan lines of the plurality of scan lines for transmitting scan signals to the different scan lines, and one of the scan signals comprises an effective level signal; and a period during which a first gate drive unit of the plurality of first gate drive units at a first stage transmits the effective level signal to a respective scan line of the plurality of scan lines is a first period, and a period during which a second gate drive unit of the plurality of second gate drive units at a first stage transmits the effective level signal to a respective scan line of the plurality of scan lines is a second period, wherein the first period and the second period overlap, overlap duration of the first period and the second period is t, and t>0;

wherein the single first gate drive unit comprises a first driver circuit and a second driver circuit, and the single second gate drive unit comprises a third driver circuit and a fourth driver circuit:

wherein each of one of the plurality of the first gate drive units and one of the plurality of the second gate drive units comprises a scan control circuit, a node control circuit, a reset circuit, a first stage output circuit, a first output circuit, and a second output circuit, and the scan control circuit is connected to the node control circuit, the reset circuit, a forward input terminal, an inverse input terminal, a forward scan signal terminal, an inverse scan signal terminal, a first input terminal, and a second input terminal; the first stage output circuit is electrically connected to the node control circuit, the first output circuit, the second output circuit, and a first stage terminal; the node control circuit is further electrically connected to the reset circuit, the first output circuit, and the second output circuit; the reset circuit is further electrically connected to a second level terminal; and the first output circuit is further connected to a third input terminal and a first output terminal, and the second output circuit is further connected to a fourth input terminal and a second output terminal, wherein in the one first gate drive unit, a first driver circuit and a second driver circuit share the scan control circuit, the node control circuit, the reset circuit, and the first stage output circuit, the first driver circuit further comprises the first output circuit, and the second driver circuit further comprises the second output circuit; and wherein in the one second gate drive unit, a third driver circuit and a fourth driver circuit share the scan control circuit, the node control circuit, the reset circuit, and the first stage output circuit, the third driver circuit further comprises the first output circuit, and the fourth driver circuit further comprises the second output circuit.

2. The display panel according to claim 1, wherein a single first gate drive unit of the plurality of first gate drive units is electrically connected to two scan lines of the plurality of scan lines, a single second gate drive unit of the plurality of second gate drive units is electrically connected to two scan lines of the plurality of scan lines, the two scan lines connected to the single first gate drive unit are not adjacent in a first direction, and the two scan lines connected to the single second gate drive unit are not adjacent in the first direction, wherein the first direction is an alignment direction of the plurality of scan lines.

3. The display panel according to claim 2, and the first driver circuit and the second driver circuit are respectively connected to the two scan lines connected to the single first gate drive unit; and the third driver circuit and the fourth driver circuit are respectively connected to the two scan lines connected to the single second gate drive unit.

4. The display panel according to claim 3, wherein in the first direction, the first driver circuit and the second driver circuit are connected to an odd-numbered scan line of the plurality of scan lines, and the third driver circuit and the fourth driver circuit are connected to an even-numbered scan line of the plurality of scan lines.

5. The display panel according to claim 3, wherein the non-display region comprises a first non-display region and a second non-display region, the first non-display region and the second non-display region are located on two sides of the display region in a second direction, and the second direction is an extension direction of the plurality of scan lines; and the first non-display region is provided with one first gate drive unit group of the at least one first gate drive unit group and one second gate drive unit group of the at least one second gate drive unit group, and the second non-display region is provided with another first gate drive unit group of the at least one first gate drive unit group and another second gate drive unit group of the at least one second gate drive unit group; in the two first gate drive unit groups, a first driver circuit at a same stage is connected to a same scan line of the plurality of scan lines, and a second driver circuit at a same stage is connected to a same scan line of the plurality of scan lines; and in the two second gate drive unit groups, a third driver circuit at a same stage is connected to a same scan line of the plurality of scan lines, and a fourth driver circuit at a same stage is connected to a same scan line of the plurality of scan lines.

6. The display panel according to claim 5, wherein the display panel further comprises first clock signal line groups and second clock signal line groups, the first clock signal line group comprises a plurality of clock signal lines, and the second clock signal line group comprises a plurality of clock signal lines, one of the plurality of first gate drive units is electrically connect to the plurality of clock signal lines in the first clock signal line group, and one of the plurality of second gate drive units is electrically connect to the plurality of clock signal lines in the second clock signal line group; and the first non-display region is provided with one first clock signal line group and one second clock signal line group, and the second non-display region is provided with one first clock signal line group and one second clock signal line group.

7. The display panel according to claim 6, wherein in the first clock signal line group, clock signal lines of the plurality of clock signal lines connected to a first driver circuit and clock signals of the plurality of clock signal lines connected to a second driver circuit are at least partially different; and in the second clock signal line group, clock signal lines of the plurality of clock signal lines connected to a third driver circuit and clock signals of the plurality of clock signal lines connected to a fourth driver circuit are at least partially different.

8. The display panel according to claim 6, wherein the first gate drive unit at the first stage is connected to a first start trigger signal line, the second gate drive unit at the first stage is connected to a second start trigger signal line, and a period during which the first start trigger signal line sends an effective level signal to the first gate drive unit at least partially overlaps a period during which the second start trigger signal line sends an effective level signal to the second gate drive unit.

9. The display panel according to claim 3, wherein the non-display region comprises a first non-display region and a second non-display region, and the first non-display region and the second non-display region are located on two sides of the display region in a second direction; and the at least one first gate drive unit group is located in the first non-display region, and the at least one second gate drive unit group is located in the second non-display region; and the first driver circuit, the second driver circuit, the third driver circuit, and the fourth driver circuit are connected to different scan lines of the plurality of scan lines.

10. The display panel according to claim 9, further comprising a first clock signal line group and a second clock signal line group, wherein the first clock signal line group comprises a plurality of clock signal lines, the second clock signal line group comprises a plurality of clock signal lines, and one of the plurality of first gate drive units is electrically connect to the plurality of clock signal lines in the first clock signal line group; and one of the plurality of second gate drive units is electrically connect to the plurality of clock signal lines in the second clock signal line group, the first clock signal line group is located in the first non-display region, and the second clock signal line group is located in the second non-display region.

11. The display panel according to claim 10, wherein in the first clock signal line group, clock signal lines of the plurality of clock signal lines connected to a first driver circuit and clock signals of the plurality of clock signal lines connected to a second driver circuit are at least partially different; and in the second clock signal line group, clock signal lines of the plurality of clock signal lines connected to a third driver circuit and clock signals of the plurality of clock signal lines connected to a fourth driver circuit are at least partially different.

12. The display panel according to claim 9, wherein the first gate drive unit at the first stage is connected to a first start trigger signal line, the second gate drive unit at the first stage is connected to a second start trigger signal line, a period during which the first start trigger signal line sends an effective level signal to the first gate drive unit coincides with a period during which the second start trigger signal line sends an effective level signal to the second gate drive unit.

13. The display panel according to claim 12, wherein duration during which the first start trigger signal line sends a single effective level signal to the first gate drive unit is greater than duration during which the first gate drive unit transmits a single effective level signal to a corresponding scan line or duration during which the second gate drive unit transmits a single effective level signal to a corresponding scan line.

14. The display panel according to claim 1, wherein the node control circuit comprises a first transistor, a second transistor, and a third transistor, wherein a gate of the first transistor is connected to a first node, a first electrode of the first transistor is connected to the first stage terminal, and a second electrode of the first transistor is connected to a second node; a gate of the second transistor is connected to the second node, a first electrode of the second transistor is connected to the first stage terminal, and a second electrode of the second transistor is connected to the first node; and a gate of the third transistor is connected to the second level terminal, a first electrode of the third transistor is connected to the second node, and a second electrode of the third transistor is connected to a third node;

the reset circuit comprises a fourth transistor, wherein a gate of the fourth transistor is connected to the scan control circuit, a first electrode of the fourth transistor is connected to the second level terminal, and a second electrode of the fourth transistor is connected to the first node;

the first stage output circuit comprises a fifth transistor and a first capacitor, wherein a gate of the fifth transistor is connected to the first node, a first electrode of the fifth transistor is connected to the first stage terminal, and a second electrode of the fifth transistor is connected to the first output terminal and the second output terminal; and the first capacitor is connected between the first stage terminal and the first node;

the first output circuit comprises a sixth transistor and a second capacitor, wherein a gate of the sixth transistor is connected to the third node, a first electrode of the sixth transistor is connected to the third input terminal, and a second electrode of the sixth transistor is connected to the first output terminal; and the second capacitor is connected between the third node and the first output terminal;

the second output circuit comprises a seventh transistor and a third capacitor, wherein a gate of the seventh transistor is connected to the third node, a first electrode of the seventh transistor is connected to the fourth input terminal, and a second electrode of the seventh transistor is connected to the second output terminal; and the third capacitor is connected between the third node and the second output terminal; and the scan control circuit comprises an eighth transistor, a ninth transistor, a tenth transistor, and an eleventh transistor, wherein the gate of the eighth transistor is connected to the forward input terminal, a first electrode of the eighth transistor is connected to the forward scan signal terminal, and a second electrode of the eighth transistor is connected to the second node; the gate of the ninth transistor is connected to the inverse input terminal, a first electrode of the ninth transistor is connected to the inverse scan signal terminal, and a second electrode of the ninth transistor is connected to the second node; the gate of the tenth transistor is connected to the forward scan signal terminal, a first electrode of the tenth transistor is connected to the first input terminal, and a second electrode of the tenth transistor is connected to the gate of the fourth transistor; and the gate of the eleventh transistor is connected to the inverse scan signal terminal, a first electrode of the eleventh transistor is connected to the second input terminal, and a second electrode of the eleventh transistor is connected to the gate of the fourth transistor.

15. The display panel according to claim 1, wherein among the plurality of cascaded first gate drive units, the second output terminal of the second driver circuit in a first gate drive unit at this stage is connected to the forward input terminal of a first gate drive unit at a next stage, and the inverse input terminal of the first gate drive unit at this stage is connected to the first output terminal of the first driver circuit in the first gate drive unit at the next stage; and among the plurality of cascaded second gate drive units, the second output terminal of the second driver circuit in a second gate drive unit at this stage is connected to the forward input terminal of a second gate drive unit at a next stage, and the inverse input terminal of the second gate drive unit at this stage is connected to the first output terminal of the first driver circuit in the second gate drive unit at the next stage.

16. The display panel according to claim 1, wherein in a same first gate drive unit of the plurality of first gate drive units, the first input terminal, the second input terminal, the third input terminal, and the fourth input terminal corresponding to the first driver circuit and the second driver circuit are respectively connected to different clock signal lines;

in a same second gate drive unit of the plurality of second gate drive units, the first input terminal, the second input terminal, the third input terminal, and the fourth input terminal corresponding to the first driver circuit and the second driver circuit are respectively connected to different clock signal lines; and the first gate drive unit and the second gate drive unit correspond to different clock signal lines.

17. The display panel according to claim 1, wherein in a same first gate drive unit of the plurality of first gate drive units, the first input terminal is electrically connected to the second output terminal, and the second input terminal is electrically connected to the inverse input terminal; and in a same second gate drive unit of the plurality of second gate drive units, the first input terminal is electrically connected to the second output terminal, and the second input terminal is electrically connected to the inverse input terminal.

18. A display device, comprising a display panel, wherein the display panel comprises:

a display region and a non-display region at least partially surrounding the display region;

a plurality of scan lines located in the display region; and gate drive unit groups located in the non-display region, wherein the gate drive unit groups comprises at least one first gate drive unit group and at least one second gate drive unit group, a first gate drive unit group of the at least one first gate drive unit group comprises a plurality of first gate drive units which are cascaded, a second gate drive unit group of the at least one second gate drive unit group comprises a plurality of second gate drive units which are cascaded, the plurality of first gate drive units and the plurality of second gate drive units are connected to different scan lines of the plurality of scan lines for transmitting scan signals to the different scan lines, and one of the scan signals comprises an effective level signal; and a period during which a first gate drive unit of the plurality of first gate drive units at a first stage transmits the effective level signal to a respective scan line of the plurality of scan lines is a first period, and a period during which a second gate drive unit of the plurality of second gate drive units at a first stage transmits the effective level signal to a respective scan line of the plurality of scan lines is a second period, wherein the first period and the second period overlap, overlap duration of the first period and the second period is t, and $t>0$;

wherein the single first gate drive unit comprises a first driver circuit and a second driver circuit, and the single second gate drive unit comprises a third driver circuit and a fourth driver circuit;

wherein each of one of the plurality of the first gate drive units and one of the plurality of the second gate drive units comprises a scan control circuit, a node control circuit, a reset circuit, a first stage output circuit, a first output circuit, and a second output circuit, and the scan control circuit is connected to the node control circuit, the reset circuit, a forward input terminal, an inverse input terminal, a forward scan signal terminal, an inverse scan signal terminal, a first input terminal, and a second input terminal; the first stage output circuit is electrically connected to the node control circuit, the first output circuit, the second output circuit, and a first stage terminal; the node control circuit is further electrically connected to the reset circuit, the first output circuit, and the second output circuit; the reset circuit is further electrically connected to a second level terminal; and the first output circuit is further connected to a third input terminal and a first output terminal, and the second output circuit is further connected to a fourth input terminal and a second output terminal, wherein in the one first gate drive unit, a first driver circuit and a second driver circuit share the scan control circuit, the node control circuit, the reset circuit, and the first stage output circuit, the first driver circuit further comprises the first output circuit, and the second driver circuit further comprises the second output circuit; and wherein in the one second gate drive unit, a third driver circuit and a fourth driver circuit share the scan control circuit, the node control circuit, the reset circuit, and the first stage output circuit, the third driver circuit further comprises the first output circuit, and the fourth driver circuit further comprises the second output circuit.

* * * * *